(12) United States Patent
Huerta-Ochoa

(10) Patent No.: US 9,250,001 B2
(45) Date of Patent: Feb. 2, 2016

(54) CONTROL OF AN EXPANSION VALVE REGULATING REFRIGERANT TO AN EVAPORATOR OF A CLIMATE CONTROL SYSTEM

(75) Inventor: Ruben Huerta-Ochoa, O'Fallon, MO (US)

(73) Assignee: Emerson Electric Co., St. Louis, MO (US)

( * ) Notice: Subject to any disclaimer, the term of this patent is extended or adjusted under 35 U.S.C. 154(b) by 311 days.

(21) Appl. No.: 13/532,211

(22) Filed: Jun. 25, 2012

(65) Prior Publication Data

US 2012/0260679 A1    Oct. 18, 2012

Related U.S. Application Data

(63) Continuation-in-part of application No. 12/486,550, filed on Jun. 17, 2009, now Pat. No. 8,205,465.

(51) Int. Cl.
*F25B 5/02* (2006.01)
*F25B 49/02* (2006.01)
*F25B 41/06* (2006.01)

(52) U.S. Cl.
CPC .............. *F25B 41/062* (2013.01); *F25B 5/02* (2013.01); *F25B 2341/0653* (2013.01); *F25B 2600/21* (2013.01); *F25B 2600/2513* (2013.01); *F25B 2700/21175* (2013.01); *Y02B 30/72* (2013.01)

(58) Field of Classification Search
CPC ............. F25B 41/062; F25B 2341/063; F25B 2600/2513; F25B 49/022; F25B 39/02; F25B 49/025; F25B 2341/0683; F25B 2600/21; F25B 2600/0253; F25B 2341/064; F25B 2600/02; Y02B 30/72

USPC ........... 62/117, 216, 222, 223, 224, 225, 226, 62/227, 228.1, 210, 211; 700/282, 300
See application file for complete search history.

(56) References Cited

U.S. PATENT DOCUMENTS

| | | | |
|---|---|---|---|
| 1,751,591 A | 3/1930 | McCloskey | |
| 3,842,331 A | 10/1974 | Hendrickson et al. | |
| 3,987,819 A | 10/1976 | Scheuermann | |
| 4,137,491 A | 1/1979 | Bartley et al. | |
| 4,327,758 A | 5/1982 | Uhlmann | |
| 4,618,808 A | 10/1986 | Ish-Shalom et al. | |
| 4,835,980 A * | 6/1989 | Oyanagi | F25B 41/062 62/158 |
| 4,970,423 A | 11/1990 | Tamae et al. | |
| 5,006,772 A | 4/1991 | Danby | |
| 5,007,245 A * | 4/1991 | Defenbaugh | F25B 5/02 62/117 |
| 5,227,709 A | 7/1993 | Gauthier et al. | |
| 5,316,263 A | 5/1994 | Mino | |
| 5,378,975 A | 1/1995 | Schweid et al. | |

(Continued)

*Primary Examiner* — Mohammad M Ali
*Assistant Examiner* — Meraj A Shaikh
(74) *Attorney, Agent, or Firm* — Harness, Dickey & Pierce, P.L.C.

(57) ABSTRACT

Systems and methods are provided for controlling an expansion valve of a climate control system evaporator coil. An evaporator coil temperature sensor senses temperature of refrigerant within the evaporator coil near the evaporator coil outlet. A controller determines a control set point based on the refrigerant temperature near the evaporator outlet. The control set point is used to determine a valve opening area to regulate refrigerant flow into the evaporator coil such that temperature of refrigerant at the evaporator coil outlet is within a temperature band having a lower bound within a predetermined range above the liquid-to-vapor transition temperature.

7 Claims, 39 Drawing Sheets

(56) References Cited

U.S. PATENT DOCUMENTS

| | | |
|---|---|---|
| 5,691,613 A | 11/1997 | Gutwillinger |
| 5,771,703 A | 6/1998 | Rajendran |
| 5,783,939 A | 7/1998 | Lippmann et al. |
| 6,619,613 B1 | 9/2003 | Akamatsu et al. |
| 6,667,595 B2 | 12/2003 | Wiseman |
| 6,870,346 B2 | 3/2005 | Davidov |
| 7,093,818 B2 | 8/2006 | Koeneman |
| 7,116,070 B2 | 10/2006 | MacKay |
| 7,168,677 B2 | 1/2007 | Gama et al. |
| 7,316,384 B2 | 1/2008 | Sekiya et al. |
| 7,762,094 B2 * | 7/2010 | Iwaki ............... F25B 41/062 251/129.05 |
| 7,784,296 B2 * | 8/2010 | Chen ............... F25B 41/062 62/157 |
| 2003/0070441 A1 * | 4/2003 | Moon ............... F04C 23/008 62/225 |
| 2006/0162358 A1 * | 7/2006 | VanderZee ............ F25B 49/02 62/225 |
| 2007/0175229 A1 | 8/2007 | Redlich |
| 2008/0078191 A1 * | 4/2008 | Morishita ........... F04C 18/3564 62/126 |
| 2008/0216500 A1 * | 9/2008 | Chen ............... F25B 41/062 62/225 |
| 2009/0241571 A1 * | 10/2009 | Okutsu ............. F25B 41/062 62/225 |
| 2010/0324742 A1 | 12/2010 | Huerta-Ochoa |

* cited by examiner

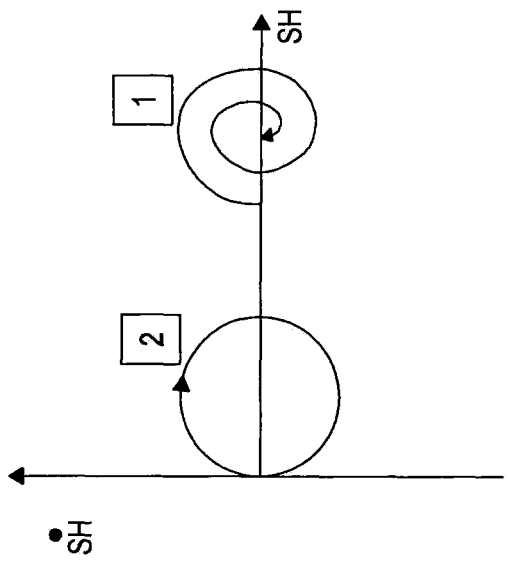

(b) Phase plane response

1. Operation of conventional refrigeration systems at high superheat set point leads to dynamical stability and suboptimal efficiency 2. Operation of refrigeration systems at low superheat optimizes efficiency at the expense of dynamical stability

FIG. 5B

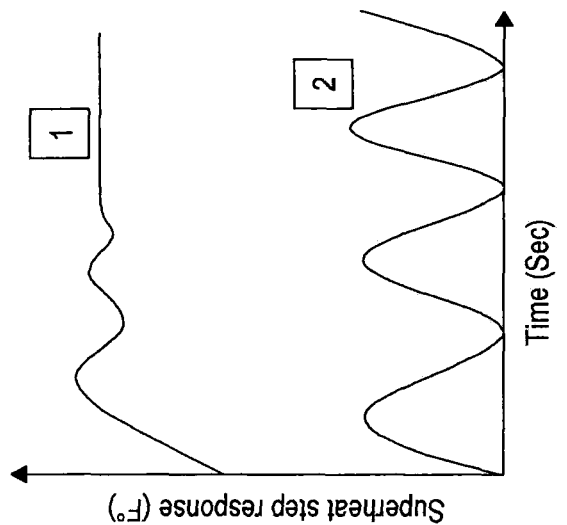

(a) Step response

1. Operation of conventional refrigeration systems at high superheat set point leads to dynamical stability and suboptimal efficiency 2. Operation of refrigeration systems at low superheat optimizes efficiency at the expense of dynamical stability

FIG. 5A

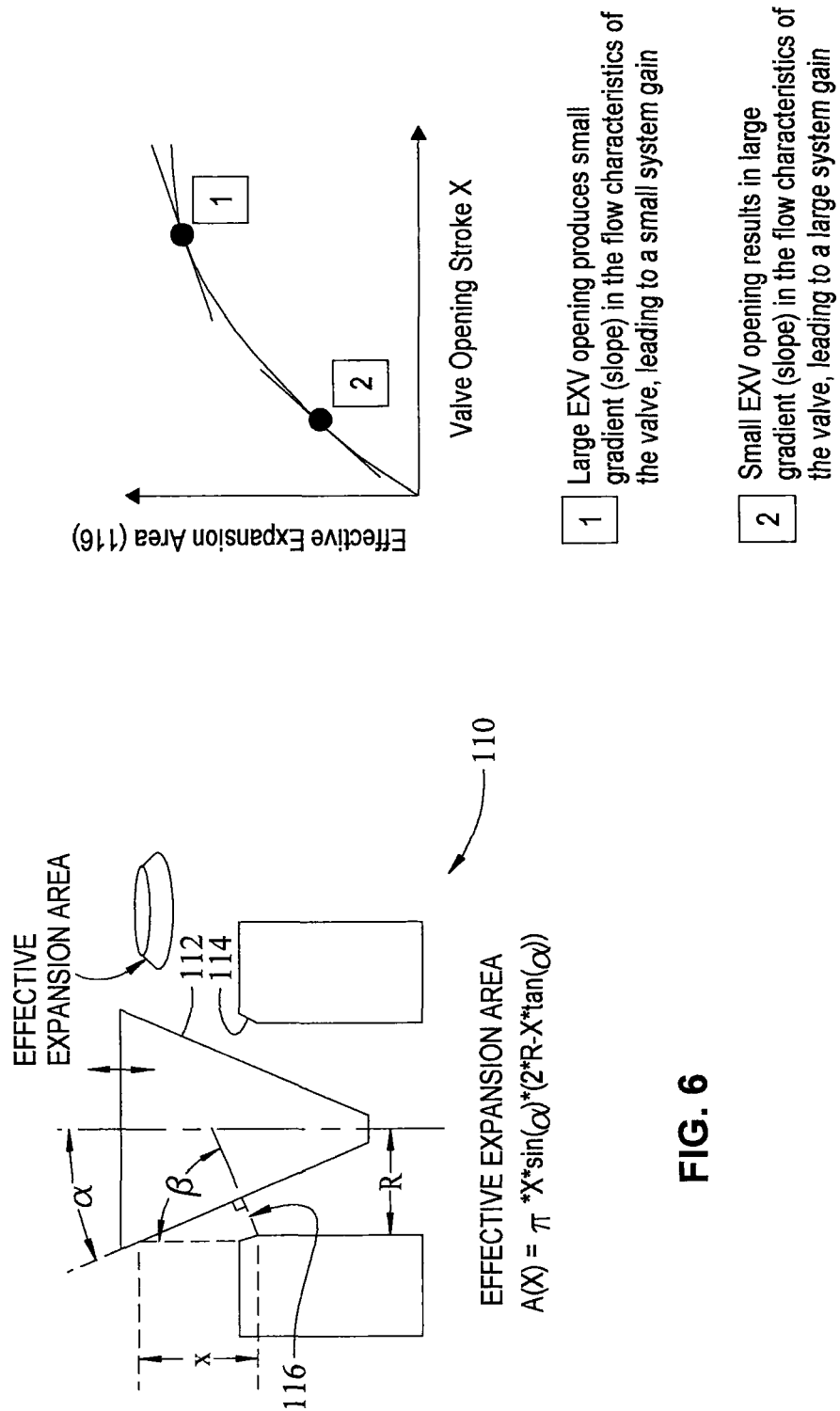

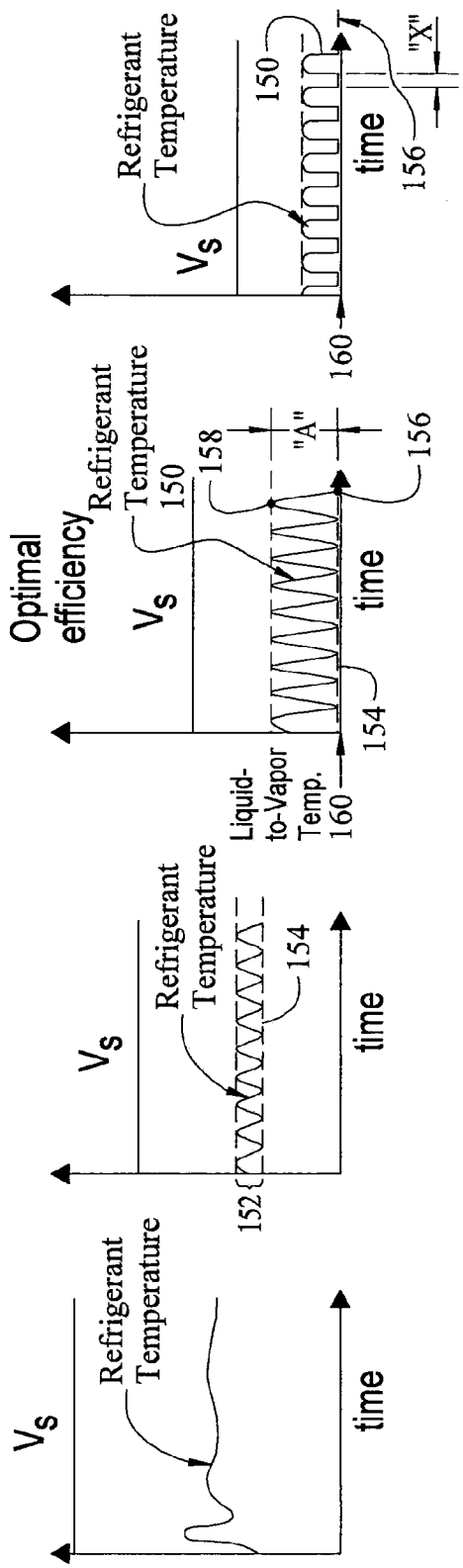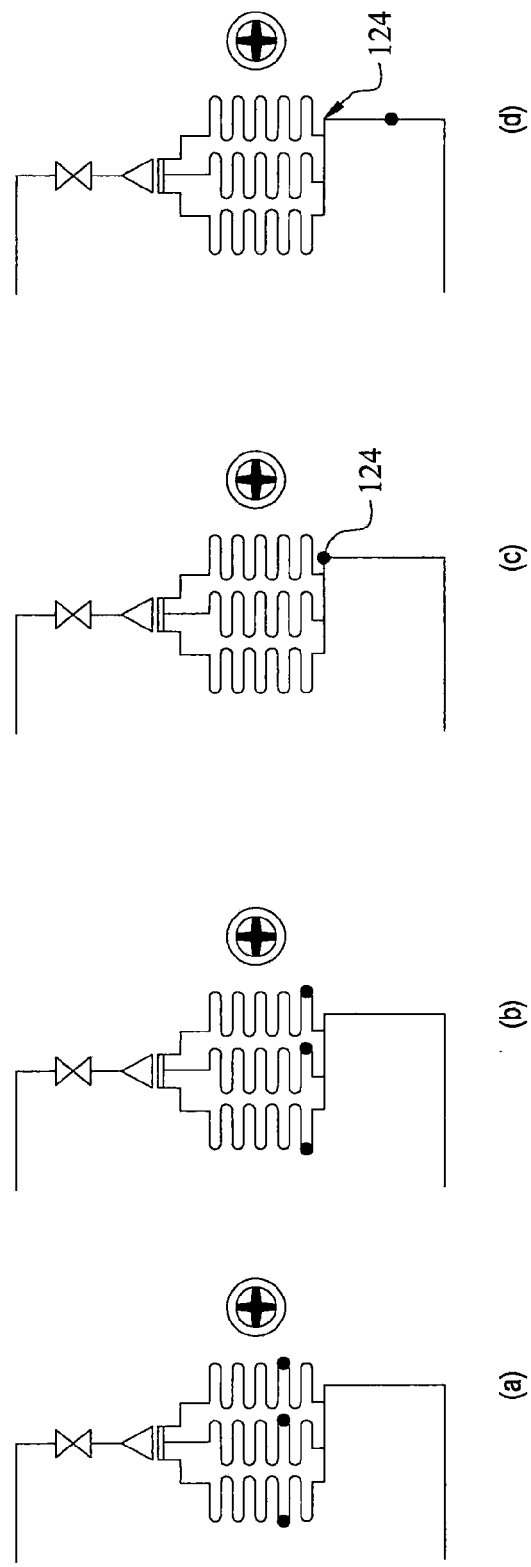
FIG. 9　　FIG. 10　　FIG. 11　　FIG. 12

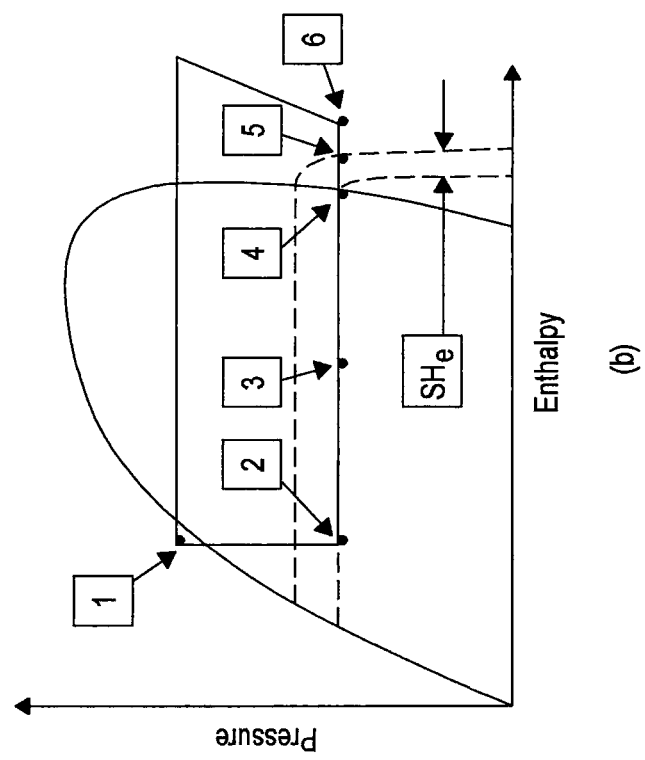
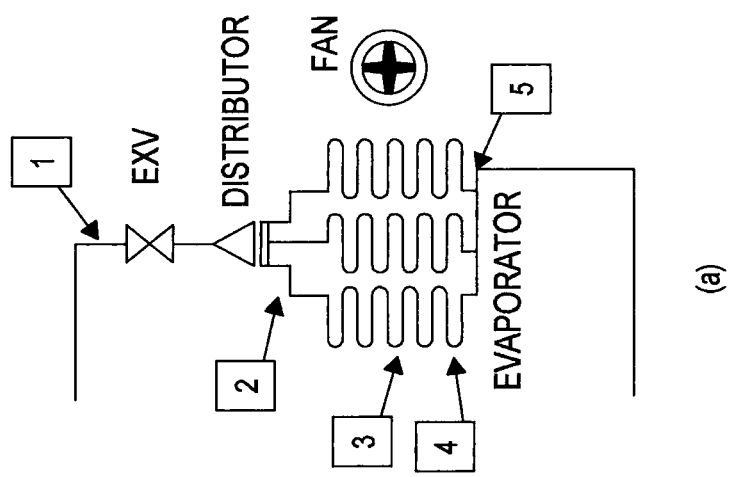
FIG. 18

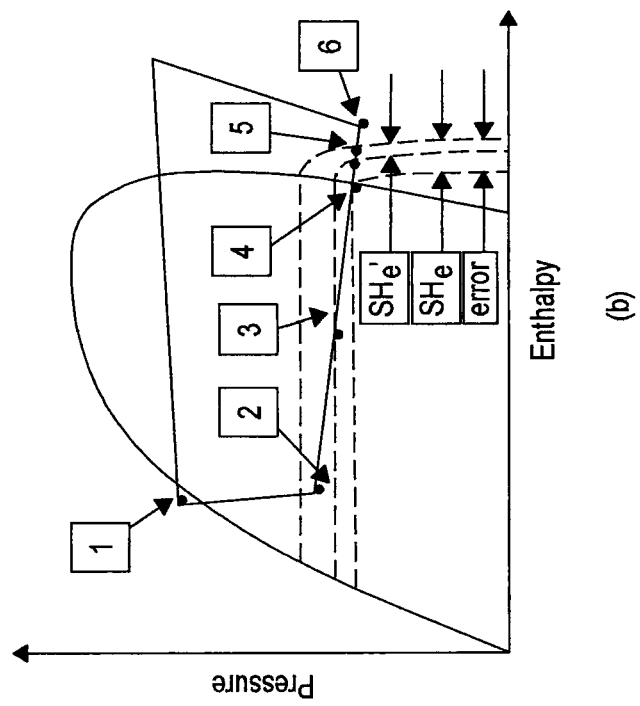
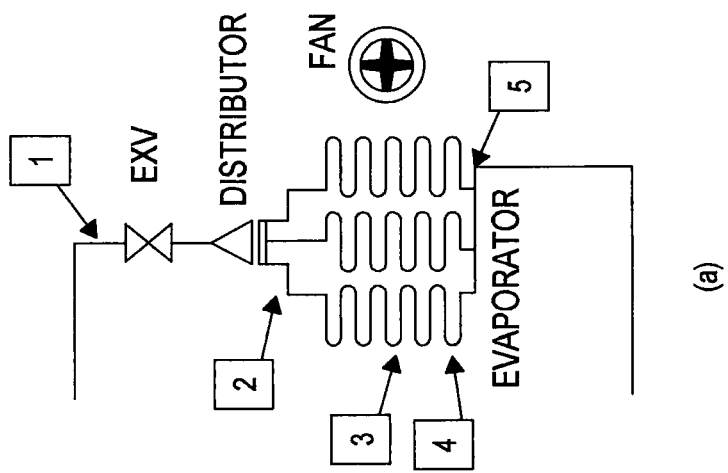
FIG. 19

Open Loop Step Response

CONTROL OF AN EXPANSION VALVE REGULATING REFRIGERANT TO AN EVAPORATOR OF A CLIMATE CONTROL SYSTEM

CROSS-REFERENCE TO RELATED APPLICATION

This application is a continuation-in-part of U.S. patent application Ser. No. 12/486,550 filed on Jun. 17, 2009, which will issue Jun. 26, 2012 as U.S. Pat. No. 8,205,465. The entire disclosure of the above application is incorporated herein by reference.

FIELD OF THE INVENTION

The present disclosure relates to flow control valves, and more particularly to motor actuated modulating flow control valves.

BACKGROUND

The statements in this section merely provide background information related to the present disclosure and may not constitute prior art.

In a conventional refrigeration or HVAC system, flow control devices are typically utilized to control the flow of working fluids in a refrigeration system. In general, the refrigeration system would include a compressor that forces the particular refrigerant used in the system through a condensing coil, where the refrigerant vapor liquefies. The liquid refrigerant passes through a thermostatic expansion valve, expanding the high pressure liquid refrigerant to a low pressure vapor. The low pressure, low temperature refrigerant discharged from the thermostatic expansion valve is then directed through an evaporator coil for absorbing heat and thus refrigerating the space inside the container surrounding the evaporator coil.

The thermostatic expansion valve functions to meter the flow of refrigerant into the evaporator coil in proportion to the rate of evaporation of the refrigerant in the evaporator coil, and is responsive to the temperature and pressure of the refrigerant leaving the evaporator coil. In this manner, the thermostatic expansion valve is intended to control flow so that the refrigerant leaves the evaporator coil at a predetermined superheat. Generally, the superheat of the refrigerant is a measure of the heat contained in the refrigerant vapor above its heat content at the boiling point (saturated vapor temperature) at the exiting pressure. Maintaining the refrigerant entering the suction line from the evaporator coil at a desired superheat level enhances the refrigeration system performance.

Thermal expansion valves are typically used, in conjunction with a suction regulator, to maintain a consistent evaporator coil pressure. In known systems, conventionally designed mechanical pressure regulators are used for this purpose. Conventional mechanical pressure regulators include a throttling element that, when moved, limits the flow of the refrigerant through the suction regulator to regulate the pressure. A diaphragm, or other sensing element, responds to variations in the inlet pressure and moves the throttling element accordingly. A reference pressure, typically exerted by a spring, is applied to one side of the diaphragm to bias the diaphragm in a desired position, or set point. High side inlet pressure is applied to the other side of the diaphragm to move the diaphragm against the spring, and thus, move the throttling element.

In many refrigeration system implementations, finer temperature control is desirable. Adjusting the setting of conventionally designed mechanical pressure regulators in such thermal expansion valves can be a time consuming, manual process. Moreover, if the refrigerant or desired temperature changes, the complicated process of manually adjusting the pressure regulator's set screw must be repeated.

SUMMARY

This section provides a general summary of the disclosure, and is not a comprehensive disclosure of its full scope or all of its features.

The present disclosure relates to various embodiments of a control system for controlling an expansion valve to regulate the flow of refrigerant to an evaporator coil of an air conditioner. In the various embodiments, the control system controls an expansion valve that regulates refrigerant flow to an evaporator coil of the air conditioning system. The expansion valve has a valve element that is movable relative to a valve port for varying an opening area of the valve port to regulate the flow of refrigerant through the valve and to the evaporator coil. The evaporator coil has an inlet and an outlet, and is configured to conduct heat to a refrigerant flowing through the evaporator coil. In conducting heat to the refrigerant, the temperature of the refrigerant exiting the evaporator coil outlet is dependent on the flow rate of the refrigerant to the evaporator coil, since flow rate effects the duration of time that heat is conducted to the refrigerant. The control system for controlling the expansion valve includes an evaporator coil outlet temperature sensor, which is configured to sense the temperature of refrigerant within the evaporator coil near the outlet of the evaporator coil. The control system further includes a controller in communication with the evaporator coil outlet temperature sensor. The controller is configured to determine a control set point based on the sensed temperature of refrigerant near the outlet of the evaporator coil. The control set point is used to determine a valve opening area sufficient to regulate the flow rate of refrigerant into the evaporator coil, such that the temperature of the refrigerant at the outlet of the evaporator coil is within a temperature band having a lower bound that is within 12 degrees Fahrenheit above the liquid-to-vapor transition temperature of the refrigerant.

In one aspect of the present disclosure, one embodiment of a controller for an expansion valve is provided. The controller is in communication with an outlet temperature sensor that is configured to sense the temperature of refrigerant near the evaporator coil outlet, where the temperature of the refrigerant at the evaporator coil outlet is dependent on the flow rate of refrigerant to the evaporator coil. The controller is also in communication with an expansion valve, and is configured to provide an output of a control variable to the expansion valve for adjusting the opening area in the expansion valve. The controller is configured to determine an initial control set point based on the temperature sensed by the evaporator coil outlet temperature sensor, which initial control set point is used to determine a first valve opening area sufficient to regulate the flow rate of refrigerant such that the temperature sensed by the outlet temperature sensor (e.g., the temperature of refrigerant at the outlet of the evaporator) is within a temperature band having a lower bound that is within 12 degrees Fahrenheit above the liquid-to-vapor transition temperature of the refrigerant. The controller is further configured to determine a control variable for establishing the initial opening area that corresponds to the determined optimum control set point, and to output the control variable to the expansion valve to thereby establish the initial flow rate of refrigerant through the expansion valve. The controller is further configured to detect the temperature sensed by the evaporator coil outlet temperature sensor over time, to thereby capture oscillations in the sensed temperature of the refrigerant which define a minimum sensed temperature and a maximum sensed temperature of the refrigerant at the evaporator coil outlet, and an amplitude "A" of the temperature oscillation. The controller is further configured to determine an optimum control set point, based on a difference between the liquid-to-vapor transition temperature and said minimum sensed temperature of the refrigerant, or based on a duration of time in which the oscillating temperature of the refrigerant at the outlet of the evaporator coil falls to the liquid-to-vapor transition temperature of the refrigerant.

In yet another aspect of the present disclosure, one embodiment of a method is provided for controlling an opening area in an expansion valve to regulate a flow rate of refrigerant therethrough to an evaporator coil. The method comprises opening the expansion valve to establish refrigerant flow, and detecting a temperature sensed by an evaporator coil outlet temperature sensor, which is used in determining an initial control set point. The method includes determining a first valve opening area sufficient to regulate the flow rate of refrigerant such that the temperature of the refrigerant at the evaporator outlet is within a temperature band having a lower bound that is within 12 degrees Fahrenheit of the liquid-to-vapor transition temperature of the refrigerant. The method further includes detecting the temperature sensed by the outlet temperature sensor over time to capture oscillations defining a minimum and maximum sensed temperature, and an amplitude "A" of the temperature oscillation. By determining a difference between the liquid-to-vapor transition temperature and minimum sensed temperature, and a duration of time in which the oscillating temperature of refrigerant at the evaporator outlet falls to the liquid-to-vapor transition temperature (if any) the method may determine an optimum set point. The method determines an optimum control set point based on the difference between the liquid-to-vapor transition temperature and the minimum sensed temperature, or on the duration of time in which the oscillating temperature of the refrigerant at the evaporator outlet falls to the liquid-to-vapor transition temperature. The method proceeds to determine an optimum valve opening area for establishing a flow rate of refrigerant that maintains the oscillating temperature of the refrigerant at an optimum level in which the minimum sensed temperature of the refrigerant at the evaporator coil outlet is within a fraction of the oscillation amplitude "A" from the liquid-to-vapor transition temperature, and the oscillating temperature of the refrigerant at the evaporator coil outlet does not fall to the liquid-to-vapor transition temperature for more than a time duration of one quarter of the period of the temperature oscillation.

In still another aspect of the present disclosure, an embodiment is provided of a controller for controlling an expansion valve of a climate control system. The climate control system includes an evaporator coil configured to conduct heat to a refrigerant flowing therethrough. The expansion valve has a variable opening area through which to regulate the flow of the refrigerant to the evaporator coil. The climate control system further includes an evaporator coil temperature sensor configured to sense temperature of the refrigerant near an outlet of the evaporator coil. Based on temperature of the refrigerant sensed by the evaporator coil temperature sensor, the controller determines a first control set point and a second control set point subsequent to the first control set point. The controller uses the control set points to determine a first valve opening area and to determine a second valve opening area subsequent to the first valve opening area, to regulate the flow rate of the refrigerant into the evaporator coil such that oscillating temperature of the refrigerant approaching the outlet of the evaporator coil: (a) is within a temperature band having a lower bound that over time approaches and/or is substantially equal to the liquid-to-vapor transition temperature of the refrigerant, and (b) at the liquid-to-vapor transition temperature of the refrigerant, has a dwell period that over time approaches and/or is substantially equal to zero. An embodiment also is provided of a climate control system that includes the controller.

In yet another aspect of the present disclosure, an embodiment of a climate control system includes an evaporator coil configured to conduct heat to a refrigerant flowing therethrough. An expansion valve has a variable opening area through which to regulate the flow of the refrigerant to the evaporator coil. An evaporator coil temperature sensor is configured to sense temperature of the refrigerant near an outlet of the evaporator coil. At least one other evaporator coil temperature sensor is configured to sense temperature of the refrigerant in the evaporator coil upstream of the outlet of the evaporator coil. A controller is in communication with the evaporator coil temperature sensors, the controller being configured to: determine a control set point based on the sensed temperatures of the refrigerant; and use the control set point to determine a valve opening area to regulate the flow rate of the refrigerant into the evaporator coil such that the temperature of the refrigerant at the outlet of the evaporator coil is within a temperature band having a lower bound that is within a predetermined range above the liquid-to-vapor transition temperature of the refrigerant.

In yet another aspect of the present disclosure, an embodiment is provided of a controller-performed method of controlling an expansion valve to regulate a flow rate of refrigerant therethrough to an evaporator coil of a climate control system. The method includes introducing perturbation to refrigerant flow through the expansion valve to produce oscillation of temperature of the refrigerant, the perturbation resulting from a duty cycle of a component of the climate control system. The method also includes determining a first control set point based on refrigerant temperature sensed by at least a temperature sensor near an outlet of the evaporator coil, and based on the first control set point, determining a first valve opening area to regulate flow of the refrigerant such that temperature of the refrigerant at the outlet of the evaporator coil is within a temperature band having a lower bound within a predetermined range relative to the liquid-to-vapor transition temperature of the refrigerant. A difference, if any, is determined between the liquid-to-vapor transition temperature and a minimum sensed temperature of the oscillating refrigerant temperature at the evaporator coil outlet. A duration of time, if any, is determined in which the oscillating refrigerant temperature at the evaporator coil outlet dwells at the liquid-to-vapor transition temperature. A second control set point is determined based on the determined difference, if any, and/or on the determined duration of time, if any. Based on the second control set point, a second valve opening area is determined for establishing a flow rate of the refrigerant that maintains the oscillating temperature of the refrigerant such that the minimum sensed temperature of the refrigerant at the evaporator coil outlet is within a fraction of an amplitude "A" of the oscillating temperature from the liquid-to-vapor transition temperature, and the determined time duration is no more than a fraction of a period of the oscillations in the oscillating temperature.

In yet another aspect of the present disclosure, an embodiment is provided of a method of controlling an expansion valve to regulate a flow rate of refrigerant therethrough to an evaporator coil. The method includes opening the expansion valve to establish refrigerant flow to the evaporator coil, and waiting a predetermined time to permit stabilization of the refrigerant flow. An initial control set point is determined based on refrigerant temperature sensed by at least a temperature sensor near an outlet of the evaporator coil. Based on the initial control set point, a first valve opening area is determined, to regulate flow of the refrigerant such that temperature of the refrigerant at the outlet of the evaporator coil is within a temperature band having a lower bound within a predetermined range above the liquid-to-vapor transition temperature of the refrigerant. Over time, oscillations in the sensed temperature of the refrigerant are captured. A difference, if any, is determined between the liquid-to-vapor transition temperature and a minimum sensed temperature of the oscillating refrigerant temperature at the evaporator coil outlet. A duration of time, if any, is determined in which the oscillating refrigerant temperature at the evaporator coil outlet dwells at the liquid-to-vapor transition temperature of the refrigerant. A second control set point is determined based on the determined difference, if any, and/or on the determined duration of time, if any. Based on the second control set point, a second valve opening area is determined for establishing a flow rate of the refrigerant that maintains the oscillating temperature of the refrigerant such that the minimum sensed temperature of the refrigerant at the evaporator coil outlet is within a fraction of an amplitude "A" of the oscillating temperature from the liquid-to-vapor transition temperature, and the determined time duration is no more than a fraction of a period of the oscillations in the oscillating temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure in any way.

FIGS. 5A-5B are graphs illustrating the difference between a high superheat setting with stability and a low superheat setting with inherent temperature oscillations and instability;

FIG. 6 is a cross-sectional view of an expansion valve of the first embodiment having a movable valve element, according to the principles of the present application;

FIGS. 7A-7B are graphs illustrating flow characteristics of flow through the expansion valve in FIG. 6, and its parabolic flow characteristics;

FIG. 9 is an illustration of the flow of refrigerant upon opening the expansion valve in the first embodiment;

FIG. 10 is an illustration of the flow of refrigerant in the first embodiment after establishing an initial control set point, in accordance with the present disclosure;

FIG. 11 is an illustration of the flow of refrigerant in the first embodiment after establishing an initial control set point;

FIG. 12 is an illustration of the flow of refrigerant in the first embodiment where the oscillations in the temperature of the refrigerant falls to the liquid-to-vapor transition temperature for a duration of time, in accordance with the present disclosure;

FIG. 18 is a graph of a P-H curve associated with a conventional air conditioning system in which the pressure drop across the evaporator is assumed to be zero;

FIG. 19 is a graph of a P-H curve associated with a conventional air conditioning system in which the evaporator actually exhibits significant pressure drop that can cause control performance problems;

Corresponding reference numerals indicate corresponding parts throughout the several views of the drawings.

DETAILED DESCRIPTION

In the following description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill.

According to various aspects of the present disclosure, exemplary embodiments are provided of a control system for an expansion valve that regulates refrigerant flow to an evaporator coil of an air conditioning system. In the various exemplary embodiments, the control system controls an expansion valve that regulates refrigerant flow to an evaporator coil of the air conditioning system. The expansion valve has a valve element that is movable relative to a valve port for varying an opening area of the valve port to regulate the flow of refrigerant through the valve and to the evaporator coil. The evaporator coil has an inlet and an outlet, and is configured to conduct heat to a refrigerant flowing through the evaporator coil. In conducting heat to the refrigerant, the temperature of the refrigerant exiting the evaporator coil outlet is dependent on the flow rate of the refrigerant to the evaporator coil, since flow rate effects the duration of time that heat is conducted to the refrigerant. The control system for controlling the expansion valve includes an evaporator coil outlet temperature sensor, which is configured to sense the temperature of refrigerant within the evaporator coil near the outlet of the evaporator coil. The control system further includes a controller in communication with the evaporator coil outlet temperature sensor. The controller is configured to determine a control set point based on the sensed temperature of refrigerant. The control set point is used to determine a valve opening area sufficient to regulate the flow rate of refrigerant into the evaporator coil, such that the temperature of the refrigerant at the outlet of the evaporator coil is within a temperature band having a lower bound that is within 12 degrees Fahrenheit above the liquid-to-vapor transition temperature of the refrigerant.

Figure 1:
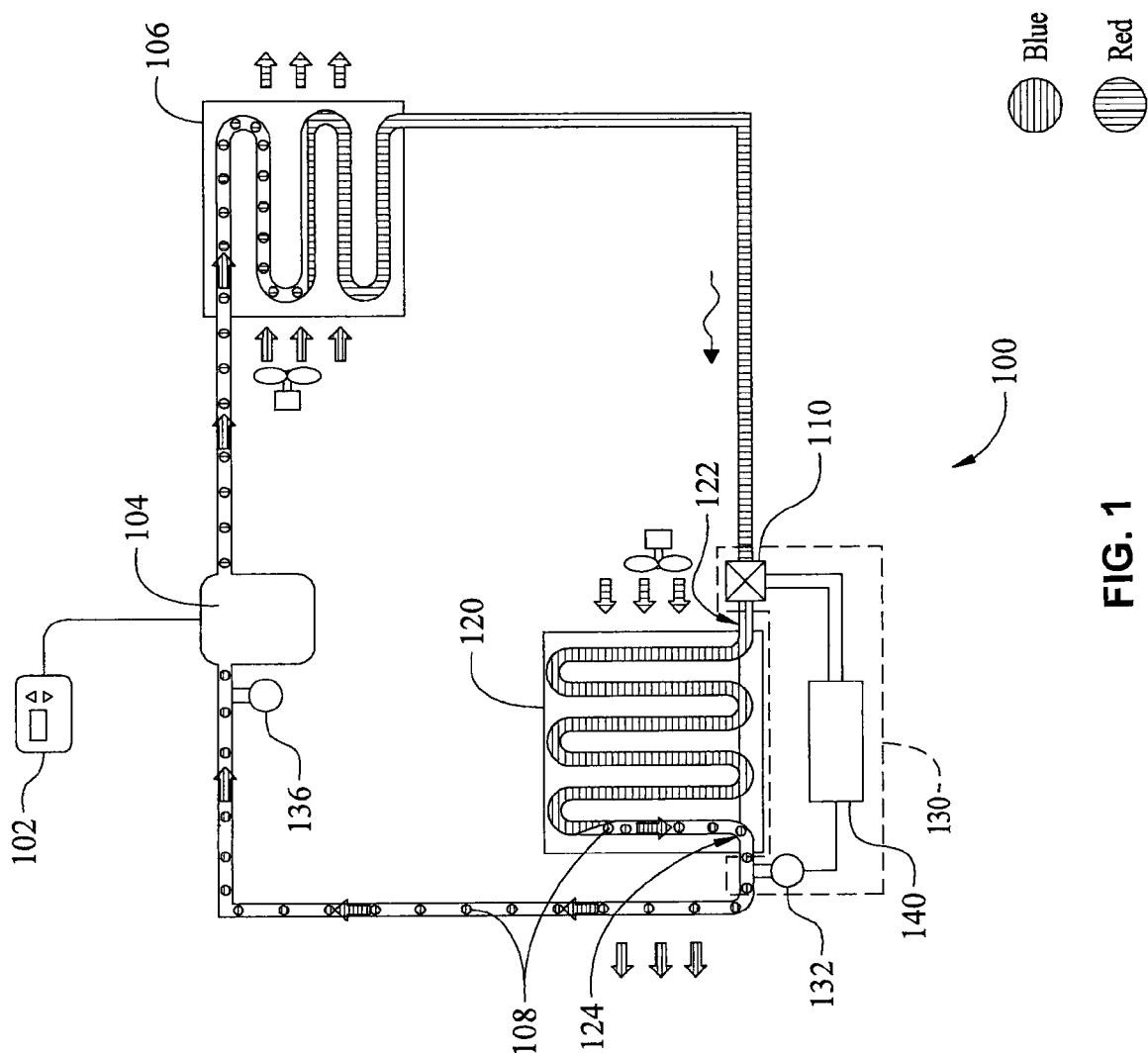
FIG. 1 is an illustration of one embodiment of a control system for controlling an expansion valve to regulate refrigerant to an evaporator in an air conditioning system, in accordance with the principles of the present disclosure.

Referring to FIG. 1, a first embodiment is shown of a control system 130 for controlling an expansion valve 110 and an evaporator coil 120 of an air conditioning system 100. The first embodiment of a control system 130 is configured to control an expansion valve 110 that regulates flow of refrigerant 108 to an evaporator coil 120 having an inlet 122 and an outlet 124. The evaporator coil 120 is configured to conduct heat to a refrigerant 108 flowing through the evaporator coil 120, wherein the temperature of the refrigerant 108 exiting an evaporator coil outlet 124 is dependent on the flow rate of the refrigerant 108 to the evaporator coil 120 (which is representative of the flow rate through the evaporator coil). The control of refrigerant flow rate and the state of the refrigerant 108 exiting the evaporator coil outlet 124 is explained in more detail below.

As shown in FIG. 1, the first embodiment of a control system controls an expansion valve 110 of an air conditioning system 100, and an aspect of the air conditioning system's refrigeration cycle. A refrigeration cycle uses a suitable refrigerant compound that is formulated to change phase from liquid to gas and vice versa, at suitable temperatures and pressures for a particular application. The refrigeration cycle starts when a thermostat 102 activates the system compressor 104, where refrigerant 108 at the compressor input is a cool, low pressure gas. The compressor 104 physically compresses the refrigerant 108 to a hot, high pressure gas, which then enters a condenser coil 106 where the refrigerant 108 changes phase from a hot, high pressure gas to a hot, high pressure liquid. The heat from the hot, high pressure liquid is transferred from the condenser coil 106 to its surroundings (e.g., the outside air or ground). In conventional air conditioning systems, the high pressure liquid refrigerant emerging from the condenser coil 106 is then passed through an expansion valve 110, and exits as a cold, low pressure liquid into an evaporator coil where it changes phase to a cold, low pressure gas. As the cool refrigerant 108 flowing through the evaporator coil 120 absorbs heat from the indoor air in the occupied space (e.g., the space being cooled), the temperature of the refrigerant 108 gradually increases. This addition of heat causes the refrigerant 108 to approach boiling point at which the refrigerant 108 turns into a vapor. In the first embodiment, the refrigerant 108 passes through a variable expansion valve 110 that is controlled by the control system 130 to regulate the rate of refrigerant flow, and thereby control where the refrigerant 108 changes phase to a gas or vapor within the evaporator coil 120. This is contrary to conventional air conditioning systems in which refrigerant is passed through a fixed nozzle, metering device, or fixed orifice expansion valve, as explained below.

Figure 2:
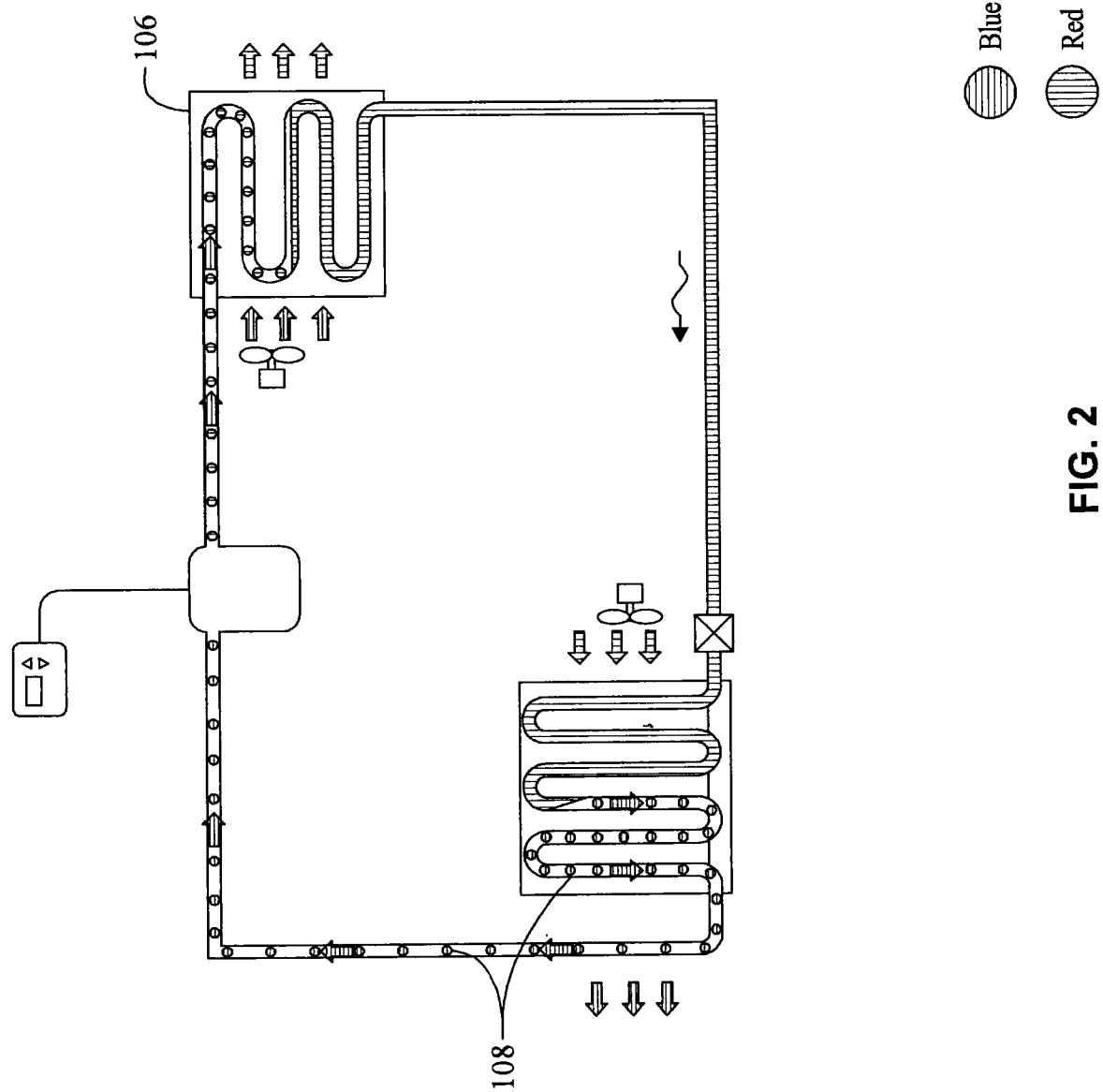
FIG. 2 is an illustration of a conventional air conditioning system.

In a conventional air conditioning system, the refrigerant will be 100 percent vapor at some point within the evaporator coil, as shown in FIG. 2. This is because conventional air conditioning systems typically have an expansion valve with a fixed orifice setting that is configured to provide less than a full flow capacity that the evaporator is rated or designed for, which causes the lower mass flow of refrigerant to transition between a liquid and a vapor at an intermediate point between the evaporator inlet and the evaporator outlet. The evaporator coil in FIG. 2 provides a large amount of surface area through which to conduct and transfer heat into the refrigerant within the coil. The refrigerant entering the evaporator coil is in a liquid state, and has a high heat absorbing capacity to permit efficient heat transfer through the surface area of the inlet portion of the evaporator coil. Once the refrigerant transitions to the vapor state, it is still cooler than the warm indoor air passing over the evaporator coil and may continue to absorb heat as it flows towards the evaporator outlet. However, once the refrigerant is in a vapor state, it has much less heat absorbing capacity than the denser liquid refrigerant that is entering the evaporator. Thus, the fixed orifice setting reduces the amount of the evaporator surface area that is utilized for effective heat transfer (reducing the evaporator coil evaporator's efficiency), for the critical purpose of ensuring that 100 percent of the refrigerant exiting the evaporator and entering the compressor is in vapor state, to prevent compressor damage (condition of liquid entering compressor known as slugging). This means that the latter half of the evaporator coil's surface area is not effectively being utilized, since the refrigerant has transitioned to the vapor state. (See FIG. 2). Thus, small conventional air conditioning systems provide a fixed orifice/flow setting that causes the refrigerant to transition from a liquid to a vapor at an intermediate point within the evaporator coil, to ensure that all refrigerant exiting the evaporator and entering the compressor is in vapor state (to prevent "slugging" or compressor damage). Conventional air conditioning systems also provide a fixed orifice/flow setting to provide a high degree of superheat to avoid system instability, as explained below.

Figure 3:
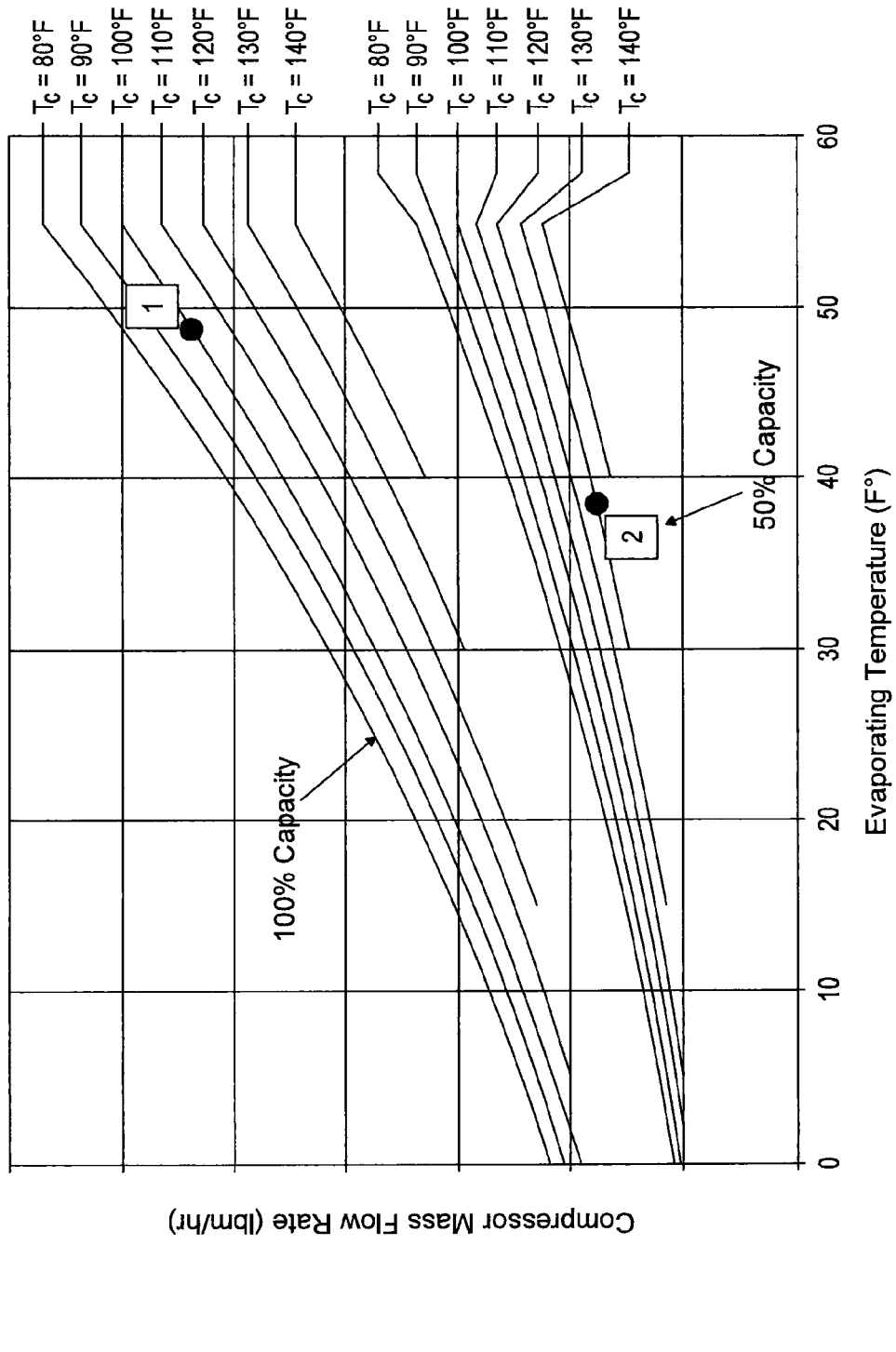
FIG. 3 is a graph illustrating the evaporating temperature of refrigerant relative to compressor capacity.
Figure 4:
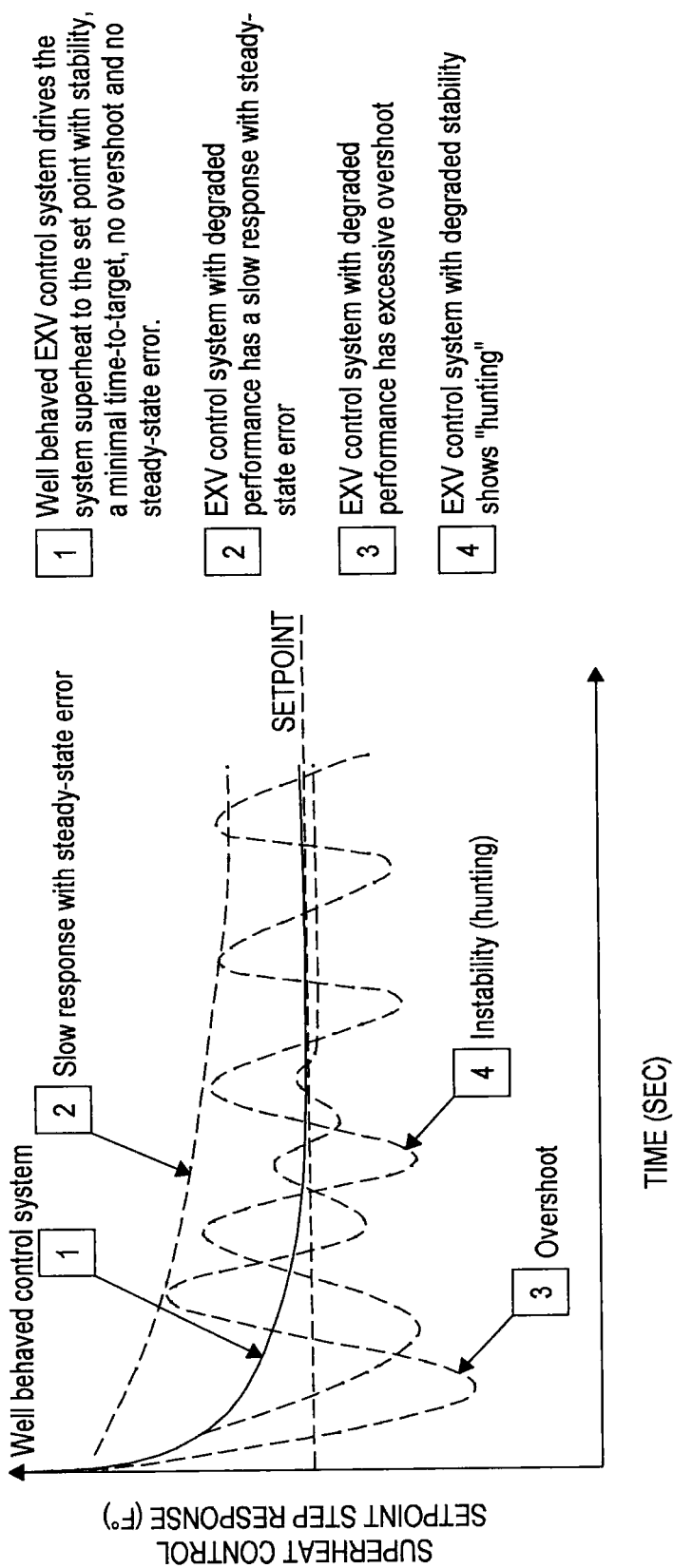
FIG. 4 is a graph of refrigerant temperature approaching a superheat control set point temperature.

The refrigerant in the vapor state near the exit of the evaporator is known as "superheated", where the amount of superheat is the difference between the evaporator saturation temperature (refrigerant temperature at evaporator inlet) and the evaporator outlet temperature (refrigerant temperature at evaporator outlet). In conventional air conditioning systems, the refrigerant transitions from liquid-to-vapor at an intermediate point in the evaporator, which causes the superheat to be generally high (on the order of 12-17° Fahrenheit, which is typically above a "minimum stable superheat" point). The amount of superheat may also vary due to operating conditions. For example, when a compressor is operated at both full capacity and less than full capacity (e.g., 50% capacity), the varying evaporating temperatures at different capacities as shown in FIG. 3 can further affect the amount of superheat. Pursuing a lower superheat (attained by an increase in mass flow of refrigerant for absorbing conducted heat) would result in inherent oscillations in the temperature of the refrigerant near the evaporator coil outlet, which can affect stability and cause the system to "hunt" for an appropriate refrigerant flow rate, as shown in FIG. 4. This is also another reason why conventional air conditioning systems provide a fixed orifice/flow setting that causes the liquid refrigerant to transition to a vapor at an intermediate point in the evaporator coil, because this maintains the refrigerant above a "minimum stable superheat" point where temperature oscillation is minimal to avoid inherent oscillations in the temperature of the refrigerant in the evaporator that can affect stability and cause the system to "hunt" for a refrigerant flow rate. This is shown in FIGS. 5A-5B, where operation of air conditioning refrigeration cycles at a less efficient high superheat set point "1" leads to stability in temperature, while operation at a more efficient low superheat set point "2" leads to temperature oscillation and dynamic instability. As shown in FIG. 5B, a high superheat refrigerant flow setting "1" will converge on a stable superheat value, while a low superheat refrigerant flow setting "2" will result in instability. Thus, one skilled in the art would be led away from the low superheat high refrigerant flow setting "2" shown in 5B that results in instability, and would be led to trade off efficiency for stability by establishing refrigerant flow that will maintain the refrigerant above a "minimum stable superheat" point to avoid "hunting" and the risk of liquid refrigerant "slugging" the compressor.

Figure 7B:
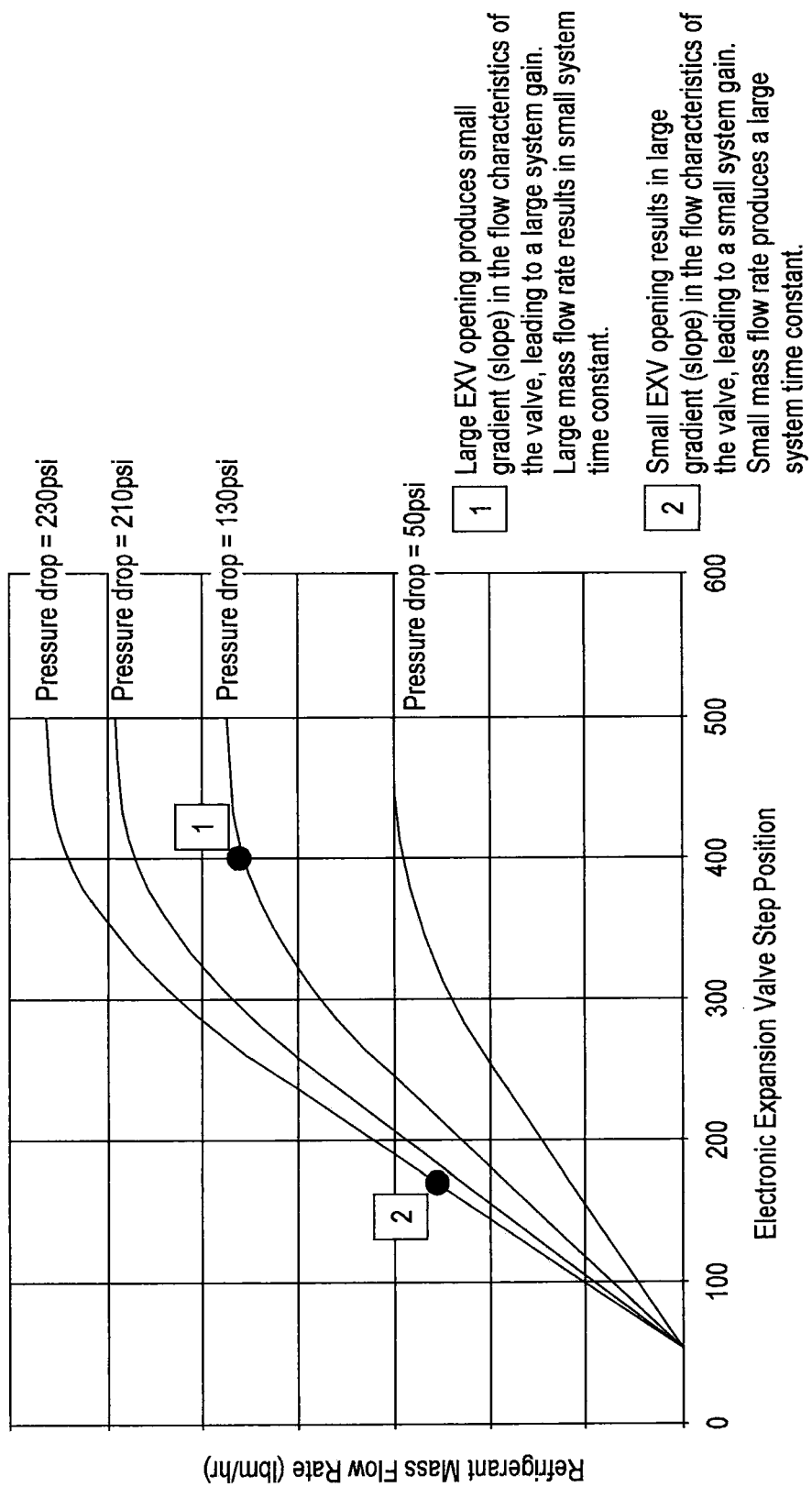

Unlike the fixed orifice/flow settings in conventional air conditioning systems (as shown in FIG. 2), the control system 130 in FIG. 1 controls an expansion valve 110 having a valve element 112 that is movable relative to a valve port 114, as shown in FIG. 6. The valve element 112 is movable for varying an opening area 116 of the valve port 114 to regulate the flow of refrigerant through the expansion valve 110 and to the evaporator coil 120 shown in FIG. 1. The opening area 116 (or expansion area) increases with valve element stroke "X" as shown in FIG. 7A. The flow characteristic of the valve opening in FIG. 6 is parabolic due to geometric properties of the valve element 112, where the effective opening area 116 or expansion area is a parabolic function of the stroke of the valve element 112. In the graph of valve opening area shown in FIGS. 7A-7B, a large opening area "1" results in a small gradient (slope) in flow, leading to a small refrigeration system gain, and a small opening area "2" results in a large gradient (slope) in flow, leading to a large system gain (as shown in FIGS. 7A-7B).

Figure 8:
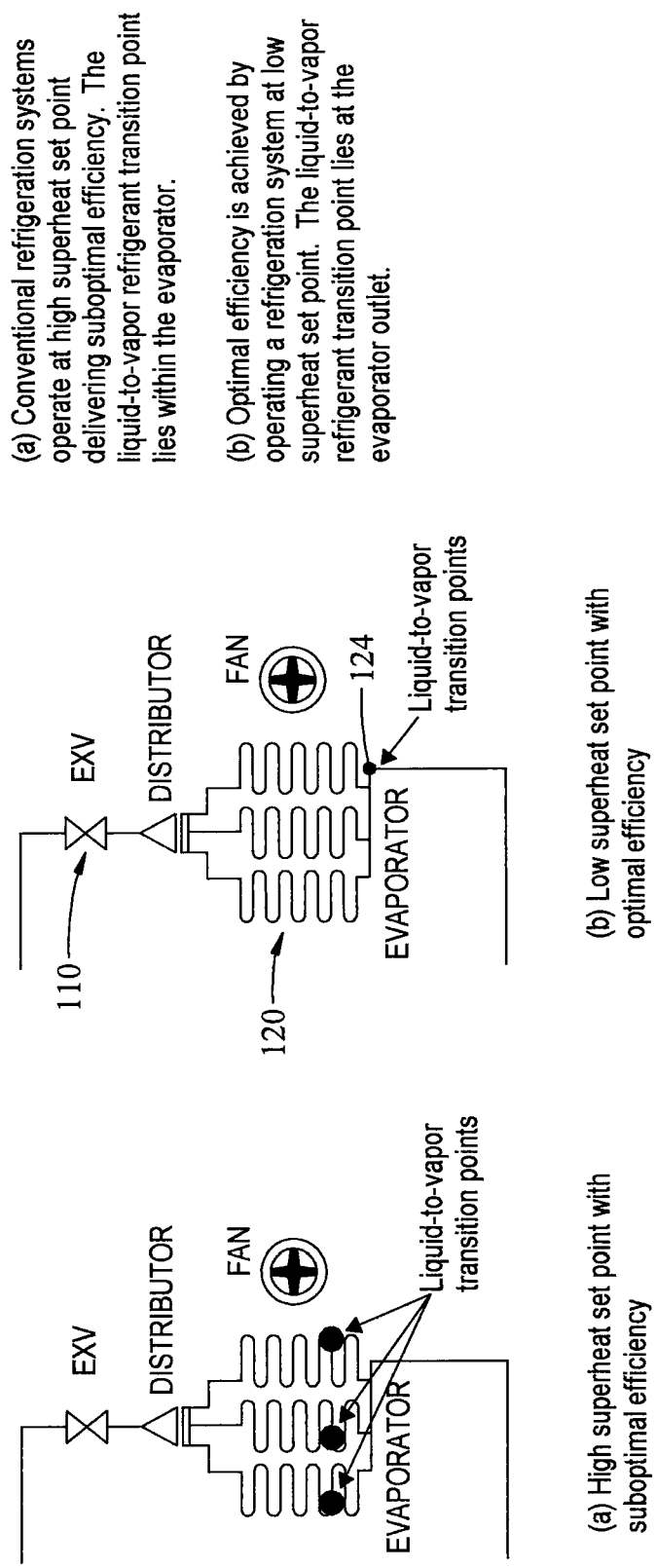
FIG. 8 is a diagram of an evaporator coil in the first embodiment, and the point at which the refrigerant within the evaporator transitions from liquid to vapor.

Referring back to FIG. 1, the control system 130 further includes an evaporator coil outlet temperature sensor 132 configured to sense the temperature of refrigerant 108 within the evaporator coil 120 near the evaporator coil outlet 124 of the evaporator coil 120, and a controller 140 in communication with the evaporator coil outlet temperature sensor 132. The controller 140 is configured to establish a flow rate of refrigerant 108 such that the point at which the refrigerant 108 within the evaporator coil 120 transitions from liquid to vapor is substantially at the evaporator coil outlet 124, as shown in FIG. 8 (contrary to the conventional air conditioning system shown in FIG. 2). FIGS. 9-12 illustrate how the controller 140 establishes such a flow rate, as explained below.

When the thermostat 102 in FIG. 1 signals a call for air conditioning to turn on the compressor 104, the expansion valve 110 opens to establish refrigerant flow, as shown in FIG. 9 (the flow rate of which stabilizes after an initial period). After stabilization occurs, the controller 140 in FIG. 1 determines a control set point, based on the temperature sensed by outlet temperature sensor 132 or the temperature of the refrigerant 108 within the evaporator coil 120 (as sensed by a sensor at an intermediate point on the evaporator coil). The control set point to be determined and established may be, for example, a desired difference between the temperature of the refrigerant 108 entering the suction line 136 to the compressor 104 (where the refrigerant temperature is more stable) and the temperature of refrigerant within the evaporator coil 120 (as sensed by a sensor at the inlet or intermediate point of the evaporator, for example). The control set point determined by the controller 140 based on the temperature sensed by the evaporator coil outlet temperature sensor 132 is determined, calculated or adjusted based on the temperature sensed by outlet temperature sensor 132, to provide an initial control set point. The initial control set point is used to determine an initial opening area 116 in the valve 110 (shown in FIG. 6) that is sufficient to regulate the flow rate of refrigerant 108 such that the temperature of the refrigerant 108 at the evaporator coil outlet 124 is within a temperature band 152 having a lower bound 154 that is within 12 degrees Fahrenheit above the liquid-to-vapor transition temperature of the refrigerant, as shown in FIG. 10 (this would be below the "minimum stable superheat" point). The controller 140 may determine the valve's opening area 116 (shown in FIG. 6) using a look-up table, for example, that is stored in the controller 140. The controller 140 may be configured to select from the look-up table a particular control variable (such as a number of motor steps or current value) that when applied to the evaporator coil 120 establishes a particular valve opening area corresponding to the determined control set point. The controller 140 in FIG. 1 applies the control variable to the expansion valve 110, to establish the particular valve opening area to establish a desired flow rate of refrigerant through the expansion valve 110. Accordingly, the controller 140 is configured to detect the refrigerant temperature sensed by the outlet temperature sensor 132, and to control the temperature of refrigerant 108 at the evaporator coil outlet 124 by determining an initial control set point that is used to control the valve's opening area 116 (shown in FIG. 6) for regulating the flow rate of refrigerant 108 through the expansion valve 110 and to the evaporator coil 120.

The controller 140 in FIG. 1 is further configured to establish an optimum flow rate of refrigerant 108 such that the liquid-to-vapor transition point of the refrigerant 108 flowing through the evaporator coil 120 is near to the evaporator coil outlet 124, as shown in FIG. 11. It should be noted that the refrigerant 108 may remain at a constant temperature while changing from a liquid to a vapor, or where a mix of refrigerants is used, the refrigerants may begin to vaporize at a first temperature and completely vaporize at a second higher temperature (called refrigerant glide). The controller 140 in FIG. 1 achieves a liquid-to-vapor transition point substantially at the evaporator coil outlet 124 by establishing an optimum flow rate of refrigerant through the expansion valve 110 that will maintain the temperature of refrigerant at the evaporator coil outlet 124 close to the liquid-to-vapor transition temperature (such as within 2 degrees Fahrenheit, for example), as explained below.

Figure 14:
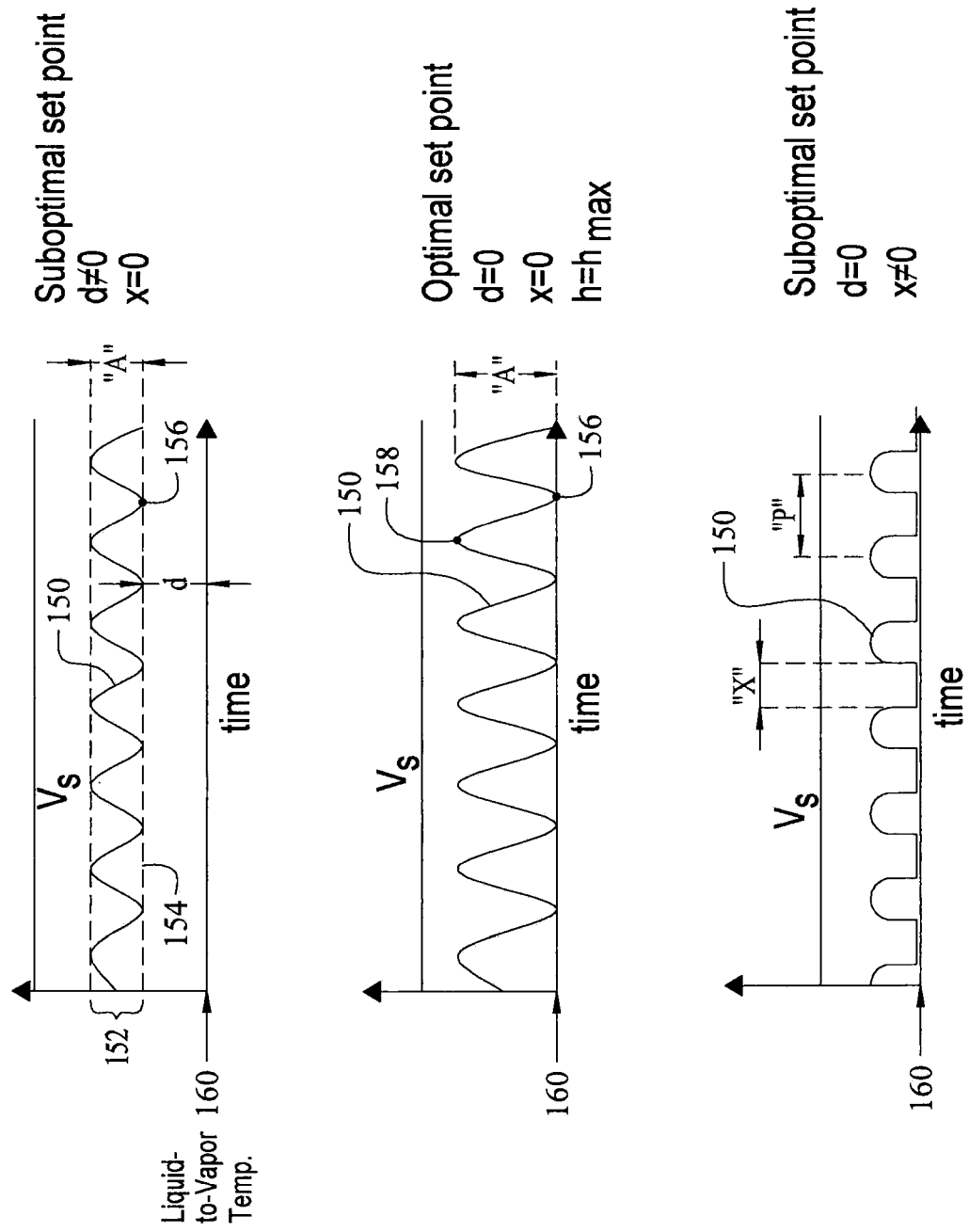
FIG. 14 is a graph illustrating the oscillations in the sensed temperature of the refrigerant at the evaporator coil outlet, in relation to the liquid-to-vapor transition temperature, in accordance with the present disclosure.

The controller 140 is further configured to detect the temperature sensed by the outlet temperature sensor 132 over time, to thereby capture oscillations in the sensed temperature of the refrigerant 108 that define a minimum sensed temperature 156 and a maximum sensed temperature 158 of the refrigerant 108 at the evaporator coil outlet 124, and an amplitude "A" of the oscillations, as shown in FIG. 11. Referring to FIG. 14, the controller 140 determines a difference "d" between a liquid-to-vapor transition temperature 160 of the refrigerant 108 and the minimum sensed temperature 156 (or lower bound 154 of temperature band 152) of the refrigerant 108 at the evaporator coil outlet (shown in FIG. 1 as 124). The controller 140 in FIG. 1 is configured to determine an optimum control set point for controlling the valve's opening area 116 (shown in FIG. 6), based in part on the difference "d" between the liquid-to-vapor transition temperature 160 and the minimum sensed temperature 156 of the refrigerant 108 at the evaporator coil outlet 124 (or lower bound 154 of temperature band 152), as shown in FIG. 14. The optimum control set point is used to determine an optimum opening area that is sufficient to establish a flow rate of refrigerant that maintains the minimum sensed temperature 156 of the refrigerant 108 at the evaporator coil outlet 124 within a fraction of the oscillation amplitude "A" from the liquid-to-vapor transition temperature 160 of the refrigerant as shown in FIG. 11. The controller thereby establishes an optimum opening area such that the minimum sensed temperature 156 is substantially at the liquid-to-vapor transition temperature 160 and the vapor-transition point is substantially at the evaporator coil outlet 124, as shown in FIG. 11. Where a determined control set point results in an oscillating temperature of refrigerant that falls to the liquid-to-vapor transition temperature 160 of the refrigerant 108 for a dwell period "x" as shown in FIG. 12, the controller 140 is further configured to determine an optimum set point to address this situation (where liquid-to-vapor transition occurs beyond evaporator coil outlet). The determination of the optimum control set point for controlling the valve's opening area 116 is also based in part on the duration of time "x" in which the oscillating temperature 150 of the refrigerant 108 at the evaporator coil outlet 124 falls to the liquid-to-vapor transition temperature 160 of the refrigerant 108, as shown in FIG. 12. The optimum control set point determined based on this duration of time "x" is used to determine an optimum valve opening area sufficient to establish a flow rate of refrigerant that maintains the minimum sensed temperature 156 of the refrigerant 108 at the evaporator coil outlet 124 within a fraction of the oscillation amplitude "A" from the liquid-to-vapor transition temperature 160 of the refrigerant 108, such that the minimum sensed temperature 156 is substantially at the liquid-to-vapor transition temperature 160, and the vapor transition point is substantially at the evaporator coil outlet 124, as shown in FIG. 12.

Figure 13:
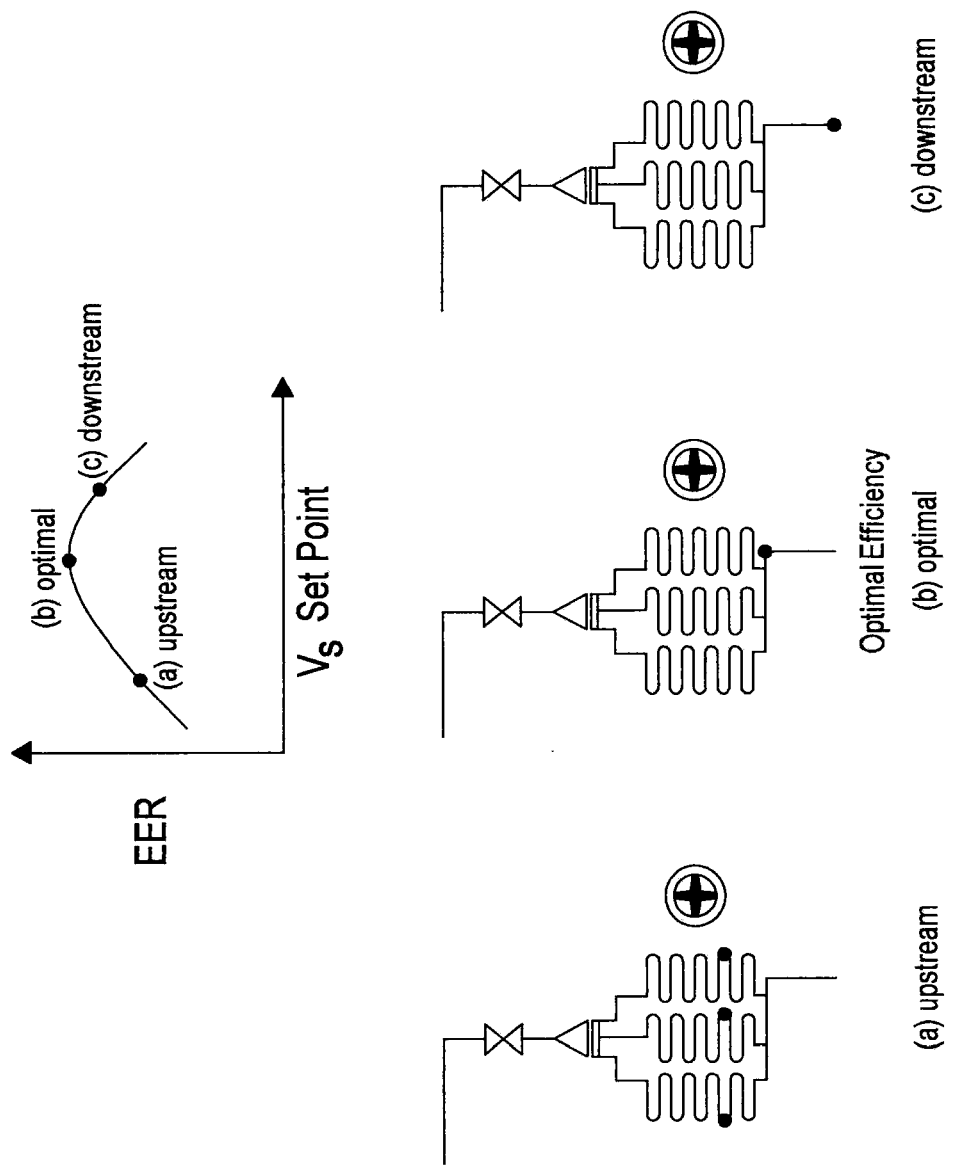
FIG. 13 is a graph of the evaporator efficiency relative to the control set points that establish a liquid-to-vapor transition point at various evaporator locations.

Accordingly, after determining an initial control set point for establishing an initial opening area, the controller 140 in FIG. 1 is configured to determine an optimum opening area for establishing a refrigerant flow rate that maintains the oscillating temperature 150 of refrigerant at the evaporator coil outlet 124 at an optimum range in which the minimum sensed temperature 156 of the refrigerant 108 at the evaporator coil outlet 124 is within a fraction of the oscillation amplitude "A" from the liquid-to-vapor transition temperature 160, and the oscillating temperature 150 of the refrigerant 108 at the evaporator coil outlet 124 does not fall to the liquid-to-vapor transition temperature 160 for more than a time duration of one quarter of the period of the temperature oscillation (see FIGS. 12 and 14). The improved evaporator efficiency resulting from this refrigerant flow control is illustrated in FIG. 13, which shows a graph of the evaporator efficiency relative to the control set points that establish a liquid-to-vapor transition point at various evaporator locations.

Figure 15:
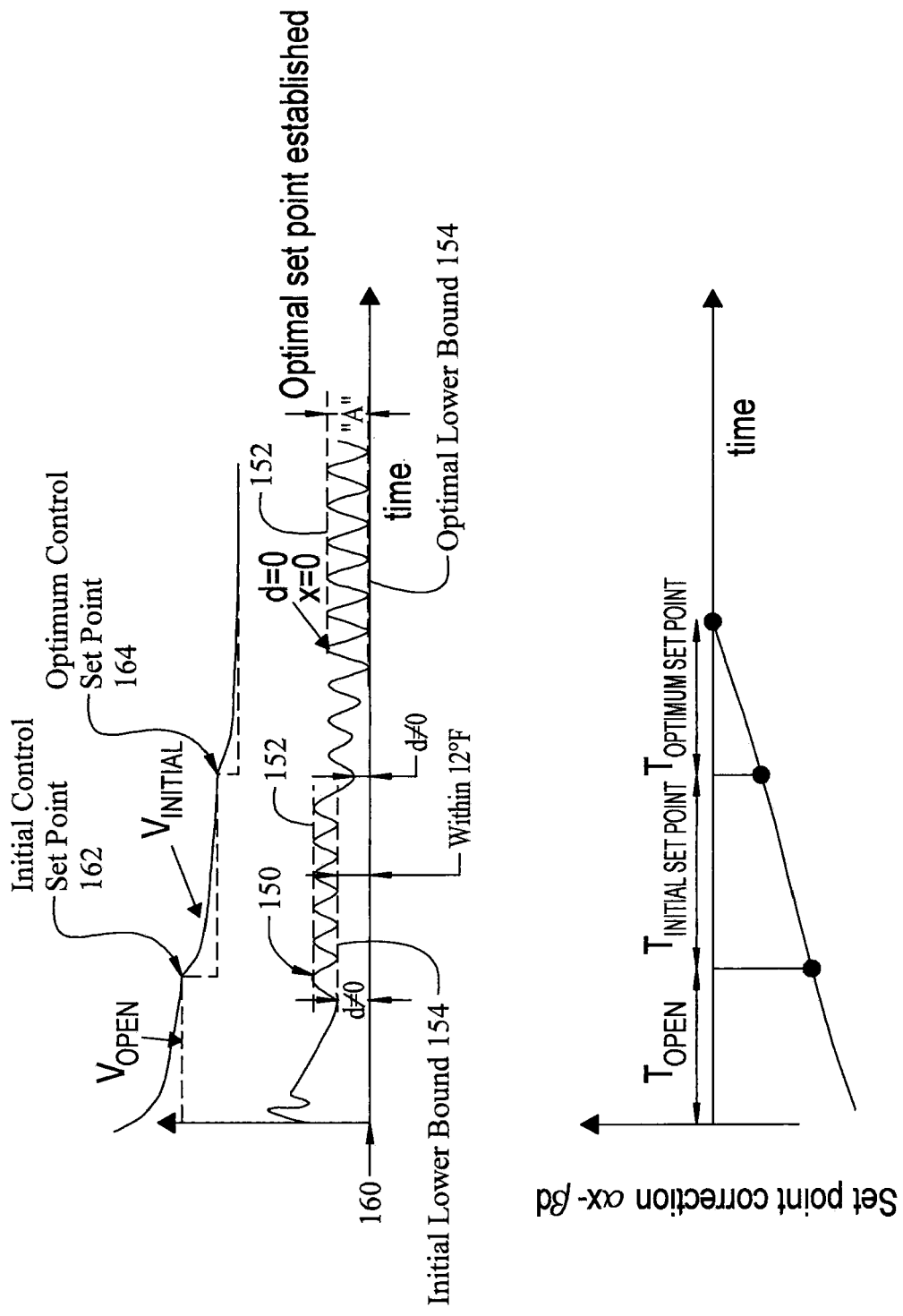
FIG. 15 is a graph showing the evolution of the control of the expansion valve opening area established by the control system of the first embodiment, in accordance with the present disclosure.

Referring to FIG. 15, a graph is shown of the evolution of the control of the expansion valve opening area by the controller 140 of FIG. 1. The expansion valve 110 is first opened to establish refrigerant flow and reach a stabilization, after which the controller 140 determines an initial control set point 162 based on the temperature sensed by the outlet temperature sensor (shown in FIG. 1 as 132), which establishes an initial valve opening area sufficient to regulate the flow rate of refrigerant such that the temperature of the refrigerant 108 at the evaporator coil outlet is within a temperature band 152 having a lower bound 154 within 12 degrees Fahrenheit of the liquid-to-vapor transition temperature 160. Based on the oscillations in temperature of the refrigerant 108 relative to the liquid-to-vapor transition temperature 160, the controller 140 is configured to determine an optimum control set point 164. The controller 140 may be configured to determine an optimum control set point 164 by using a look-up table that includes a number of optimum control set points corresponding to the difference between the liquid-to-vapor transition temperature 160 and the minimum sensed temperature 156 (see difference "d" below oscillating temperature 150 in FIG. 14). As shown in FIG. 14, the difference "d" between the liquid-to-vapor transition temperature 160 and the minimum sensed temperature 156 within the temperature oscillations 150 is an offset value. The controller 140 may be further configured to select from the look-up table an optimum control variable for establishing the optimum opening area that corresponds to a determined optimum control set point, which control variable is used for controlling the flow rate of refrigerant through the expansion valve (shown in FIG. 1 as 110). The optimum opening area establishes a flow rate of refrigerant that maintains the minimum sensed temperature 156 of the refrigerant 108 at the evaporator coil outlet 124 within a fraction of the oscillation amplitude "A" from the liquid-to-vapor transition temperature 160 of the refrigerant 108, such that the minimum sensed temperature 156 is substantially at the liquid-to-vapor transition temperature 160 (as shown in FIGS. 11 and 15) and the vapor-transition point is substantially at the evaporator coil outlet 124 (as shown in FIG. 11).

Figure 16:
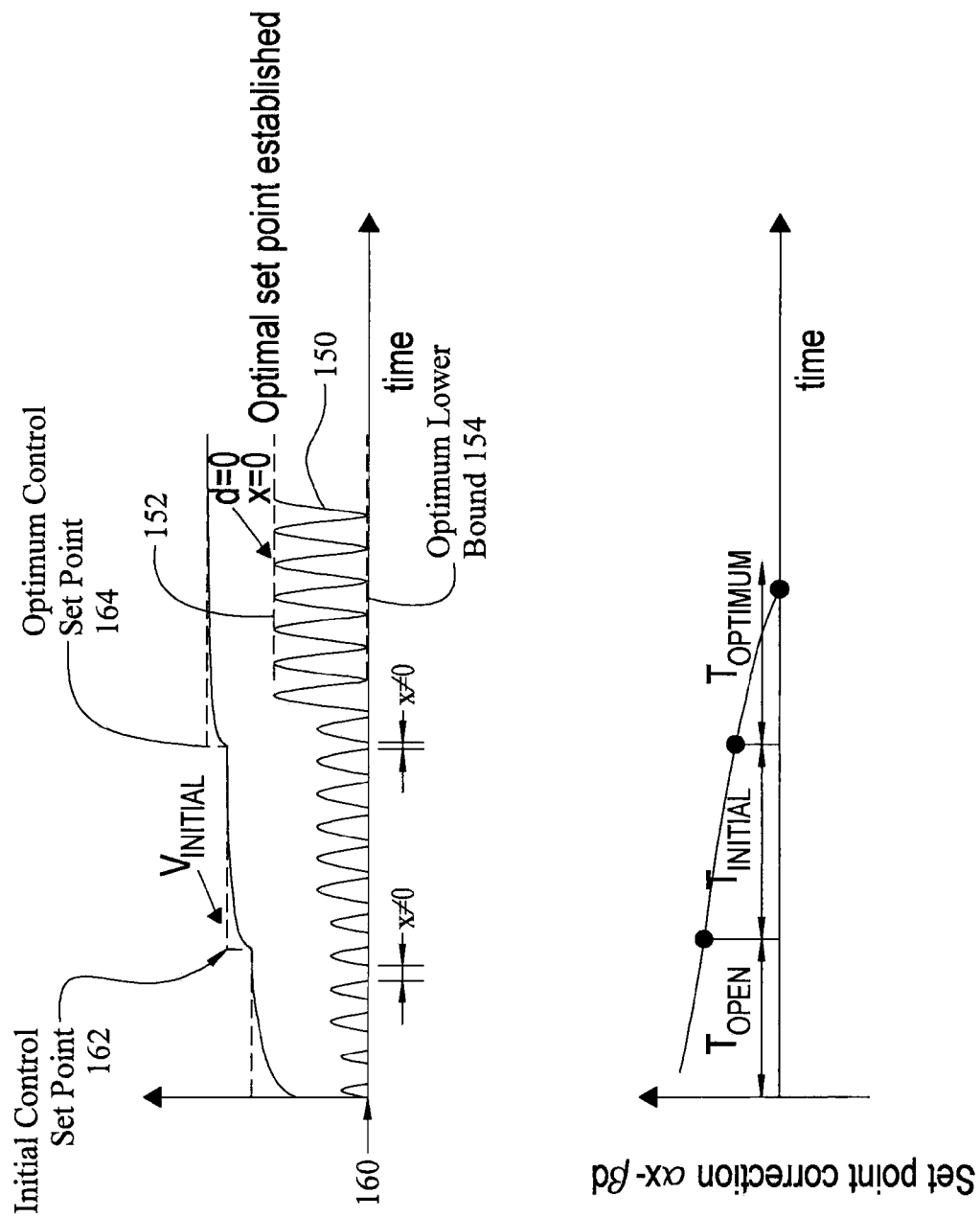
FIG. 16 is a graph showing the evolution of the control of the expansion valve opening area, where the oscillating temperature falls to a liquid-to-vapor transition point.

Referring to FIG. 16, a graph is shown of the evolution of the control of the expansion valve opening area by the controller 140 where the oscillating temperature 150 falls to the liquid-to-vapor transition point 160. Based on the oscillations in temperature of the refrigerant 108 relative to the liquid-to-vapor transition temperature 160, the controller 140 is configured to determine an optimum control set point 164 that will bring the oscillating temperature 150 of the refrigerant 108 near to and just above the liquid-to-vapor transition temperature 160. The controller 140 may be configured to determine an optimum control set point 164 by using a look-up table that includes a number of optimum control set points corresponding to the duration of time in which the oscillating temperature 150 of the refrigerant 108 falls to the liquid-to-vapor transition temperature 160 (see duration "x" below oscillating temperature 150 in FIG. 12). As shown in FIGS. 12 and 14, the time duration "t" that the oscillating temperature 150 of the refrigerant 108 at the evaporator coil outlet 124 falls below the liquid-to-vapor transition temperature 160 of the refrigerant 108 is a dwell time value. The controller 140 may further be configured to select from the look-up table an optimum control variable for establishing the optimum opening area that corresponds to the determined optimum control set point, which control variable is used for controlling the flow rate of refrigerant through the expansion valve (shown in FIG. 1 as 110). The optimum opening area establishes a flow rate of refrigerant that maintains the minimum sensed temperature 156 of the refrigerant 108 at the evaporator coil outlet 124 within a fraction of the oscillation amplitude "A" from the liquid-to-vapor transition temperature 160 of the refrigerant 108, such that the minimum sensed temperature 156 is substantially at the liquid-to-vapor transition temperature 160 (as shown in FIGS. 11 and 16), and the vapor-transition point is substantially at the evaporator coil outlet 124 (as shown in FIG. 11).

Figure 17:
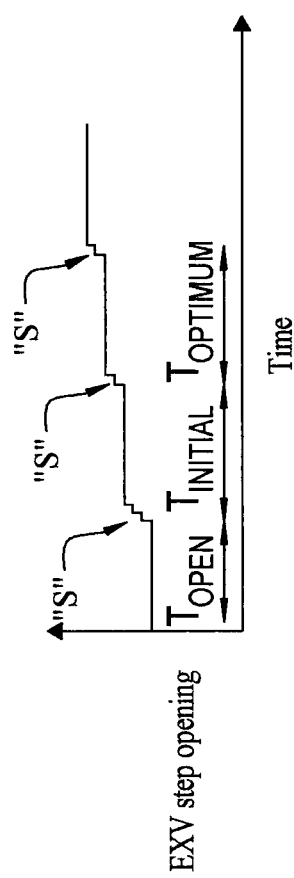
FIG. 17 is a graph illustrating how the control system is configured to determine a number of steps for a stepper motor that is configured to step the valve element to the optimum opening area, in accordance with the present disclosure.

As stated above, the controller 140 in FIG. 1 may further be configured to select from the look-up table an optimum control variable for establishing the optimum valve opening area (shown in FIG. 6 as 116) that corresponds to the determined optimum control set point, which control variable is used for controlling the flow rate of refrigerant through the expansion valve (shown in FIG. 1 as 110). For example, the controller 140 may be configured to look up a number of steps "S" associated with a stepper motor that is configured to step the valve element to the optimum valve opening area, as shown in FIG. 17. Alternatively, the controller 140 may be configured to look up a current value for operating a solenoid operated needle valve, to displace the valve element (shown in FIG. 6 as 114) to the desired position for maintaining the liquid-to-vapor transition point of the refrigerant 108 flowing through the evaporator coil 120 substantially at the evaporator coil outlet 124.

Accordingly, unlike conventional air conditioning systems in which the refrigerant's liquid-to-vapor transition point occurs at an intermediate point in the evaporator, the present control system 130 in FIG. 1 is configured to establish an optimum flow rate of refrigerant 108 such that the liquid-to-vapor transition point of the refrigerant 108 flowing through the evaporator coil 120 is substantially at the evaporator coil outlet 124. Additionally, the present control system 130 results in a lower degree of superheat, which improves the efficiency of the air conditioning refrigeration cycle. The present control system also controls refrigerant flow and superheat based on the signature of the refrigerant temperature, unlike conventional air conditioning systems in which the superheat is estimated or controlled based on temperature, as shown in FIG. 18. As shown in FIG. 18, conventional air conditioning systems assume that the pressure drop across the evaporator is zero (or constant pressure as shown in FIG. 18), and accordingly estimate superheat using the difference between refrigerant temperature at the evaporator inlet and outlet. However, as shown in FIG. 19, evaporators can exhibit significant pressure drop, which can lead to error in estimating and controlling superheat and cause control performance problems in such conventional systems. The present control system avoids this problem by controlling refrigerant flow and superheat based on the temperature oscillations of the refrigerant 108 relative to the refrigerant's 108 liquid-to-vapor transition temperature, to maintain the refrigerant's 108 liquid-to-vapor transition point substantially at the evaporator coil outlet 124. The control system 130 accomplishes this improvement by establishing an optimum flow rate of refrigerant 108 through the expansion valve 110, based on the difference between the minimum sensed temperature 156 and liquid-to-vapor transition temperature 160, and the duration of time in which the refrigerant's oscillating temperature 150 falls to the liquid-to-vapor transition temperature 160.

Figure 20:
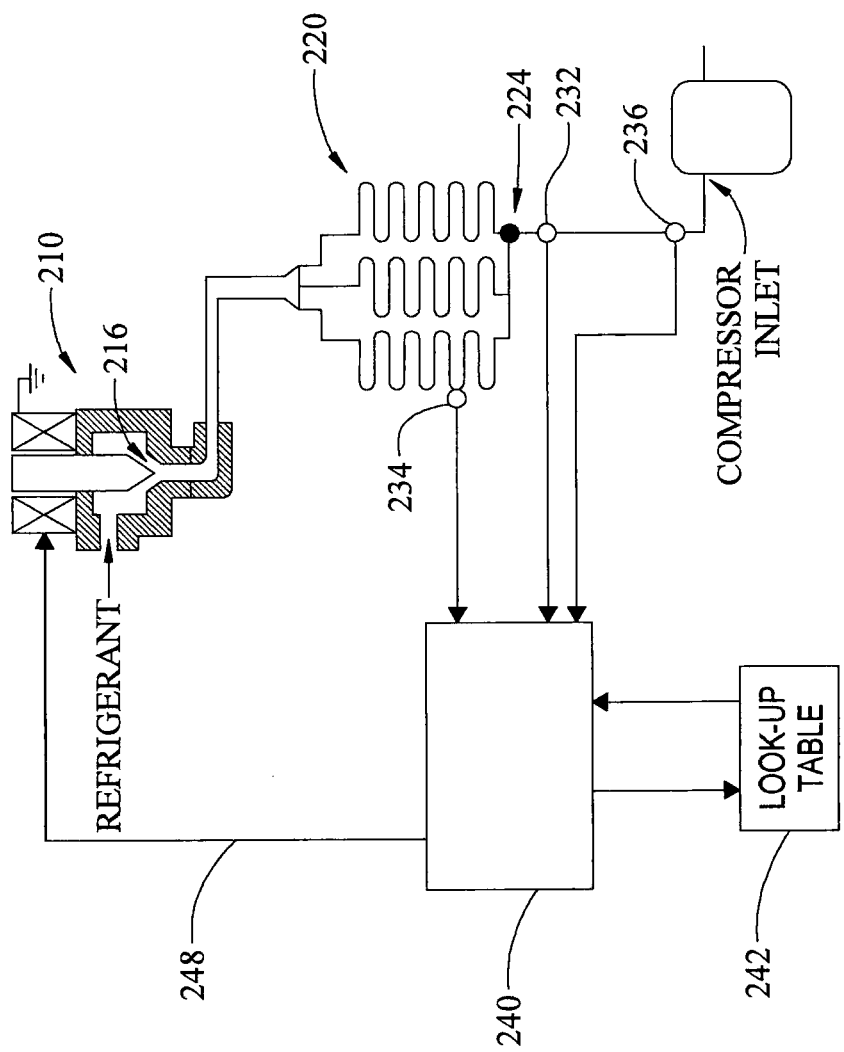
FIG. 20 is a diagram of a first embodiment of a controller for controlling an expansion valve for regulating refrigerant flow to an evaporator coil of an air conditioning system.

According to another aspect of the present disclosure, an exemplary embodiment is shown in FIG. 20 of a controller 240 for controlling an opening area 216 in an expansion valve 210 to regulate refrigerant flow to an evaporator coil 220. The controller 240 is in communication with an outlet temperature sensor 232 that is configured to sense the temperature of refrigerant near the evaporator coil outlet 224, where the temperature of the refrigerant at the evaporator coil outlet 224 is dependent on the flow rate of refrigerant to the evaporator coil 220. The controller 240 is also in communication with an expansion valve 210, and is configured to provide an output at 248 of a control variable to the expansion valve 210 for adjusting the opening area in the expansion valve 210. Specifically, the controller 240 is configured to determine a control set point, where the control set point to be determined and established may be a desired difference between the temperature of the refrigerant entering the compressor suction line 236 (where the refrigerant temperature is more stable), and the temperature of refrigerant in the evaporator coil 220 sensed by evaporator coil temperature sensor 234. The controller 240 is configured to determine an initial control set point based on the temperature sensed by the evaporator coil outlet temperature sensor 232, which initial control set point is used to determine a first valve opening area sufficient to regulate the flow rate of refrigerant such that the temperature sensed by the outlet temperature sensor 232 (e.g., the temperature of refrigerant at the outlet of the evaporator) is within a temperature band having a lower bound that is within 12 degrees Fahrenheit above the liquid-to-vapor transition temperature of the refrigerant (see FIG. 10). The controller 240 is further configured to determine a control variable for establishing an initial opening area corresponding to the initial control setpoint, and to output the control variable to the expansion valve 210 to establish the initial flow rate of refrigerant through the expansion valve 210.

The controller 240 is further configured to detect the temperature sensed by the evaporator coil outlet temperature sensor 232 over time, to thereby capture oscillations in the sensed temperature of the refrigerant which define a minimum and maximum sensed temperature of the refrigerant at the evaporator coil outlet 224, and an amplitude "A" of the temperature oscillations (see FIG. 14). The controller 240 is further configured to determine an optimum control set point, based on a difference between a liquid-to-vapor transition temperature and the minimum sensed temperature of the refrigerant, or based on a duration of time in which the oscillating temperature of the refrigerant at the evaporator coil outlet 224 of the evaporator coil 220 falls to the liquid-to-vapor transition temperature of the refrigerant. The controller 240 is further configured to determine a control variable for establishing the optimum opening area that corresponds to the determined optimum control set point, and to output the control variable to the expansion valve 210 to thereby establish the optimum flow rate of refrigerant that maintains the oscillating temperature of the refrigerant at an optimum level in which the minimum sensed temperature of the refrigerant at the evaporator coil outlet 224 within a fraction of the oscillation amplitude "A" from the liquid-to-vapor transition temperature, and the oscillating temperature of the refrigerant at the evaporator coil outlet 224 does not fall below the liquid-to-vapor transition temperature for more than a time duration of one quarter of the period "P" of the temperature oscillation. In the above determination of an optimum opening area 216, the difference between the liquid-to-vapor transition temperature and the minimum sensed temperature within the oscillations is an offset value, and the time duration that the oscillating temperature of the refrigerant at the evaporator coil outlet 224 of the evaporator coil 220 falls below the liquid-to-vapor transition temperature of the refrigerant is an offset value. The controller 240 may further include a look-up table 242, wherein the controller 240 is configured to select from the look-up table 242 a control variable for establishing the optimum valve opening area 216 corresponding to the optimum control set point, for controlling the flow rate of refrigerant through the expansion valve 210.

In an alternate construction of the embodiment shown in FIG. 20, the controller 240 may further comprise at least one other evaporator coil temperature sensor 234 upstream of the outlet temperature sensor 232 that is configured to sense temperature of refrigerant within the evaporator at a point upstream of the outlet temperature sensor 232, wherein the controller 240 is configured to determine a temperature difference between the temperature sensed by the at least one other evaporator coil temperature sensor 234 and the temperature sensed by the evaporator coil outlet temperature sensor 232 over time. The controller 240 preferably is configured to determine a temperature difference over time (between the at least one other evaporator coil temperature sensor and the evaporator coil outlet temperature sensor) to capture oscillations in the temperature of the refrigerant at the evaporator coil outlet 224. The controller 240 may be further configured to determine a control set point based on the temperature difference a second optimum opening area 216 for establishing a flow rate of refrigerant that maintains the oscillating temperature of the refrigerant at the evaporator coil outlet 224 at an optimal range, such that the minimum sensed temperature of the refrigerant at the evaporator coil outlet 224 is within a fraction of the oscillation amplitude (see "A" in FIG. 14) from the liquid-to-vapor transition temperature, and the oscillating temperature of the refrigerant at the evaporator coil outlet 224 does not fall to the liquid-to-vapor transition temperature for more than a time duration of one quarter of the period (see "P" in FIG. 14) of the temperature oscillation frequency.

Figure 21:
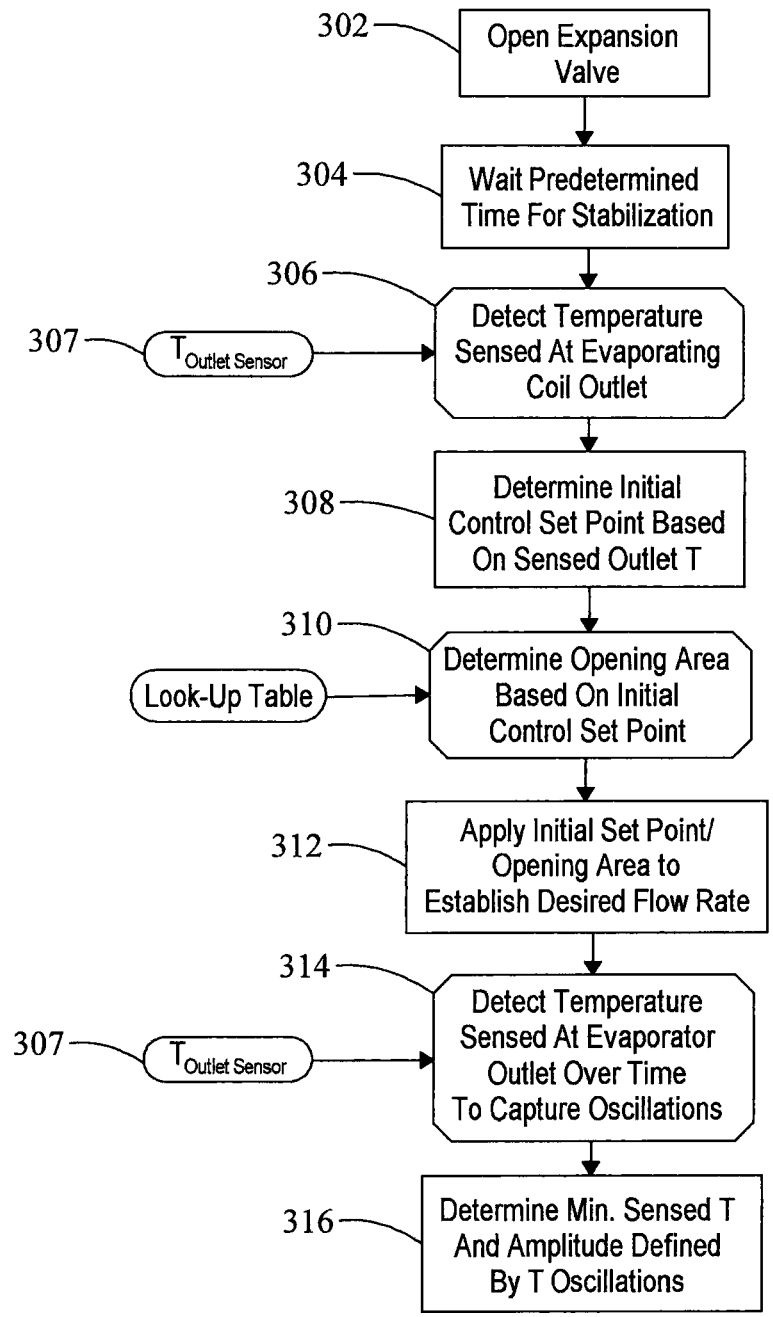
FIG. 21 is a flow chart of one embodiment of a method for controlling an opening area in an expansion valve to regulate a flow rate of refrigerant therethrough to an evaporator coil.

In another aspect of the various embodiments, a method is provided for controlling an opening area in an expansion valve to regulate a flow rate of refrigerant therethrough to an evaporator coil, as shown in FIG. 21. The method includes opening the expansion valve to establish refrigerant flow to the evaporator at step 302, and waiting a predetermined time sufficient to permit stabilization of refrigerant flow at step 304. The method further includes detecting the temperature sensed by at least the evaporator coil outlet temperature sensor at step 306 (via sensor input at 307), and determining an initial control set point based on the temperature sensed by the evaporator coil outlet temperature sensor at step 308. The method continues at step 310 by determining, based on the initial control set point, a first valve opening area that is sufficient to regulate the flow rate of refrigerant, such that the temperature of the refrigerant at the outlet of the evaporator is within a temperature band having a lower bound that is within 7 degrees Fahrenheit above the liquid-to-vapor transition temperature of the refrigerant. The method includes applying the initial control set point at step 312, to cause the expansion valve to establish the desired refrigerant flow rate. The method then detects the temperature sensed by the evaporator coil outlet temperature sensor over time, to thereby capture oscillations in the sensed temperature of the refrigerant at step 314, which defines a minimum and maximum sensed temperature of the refrigerant at the evaporator coil outlet.

Figure 22:
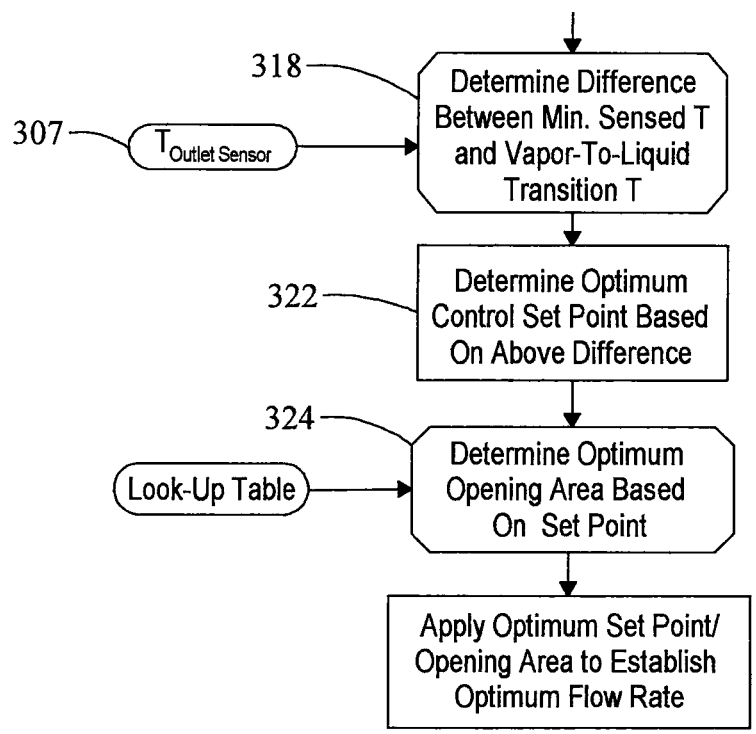
FIG. 22 is a flow chart of one embodiment of a determination of an optimum setting for the method in FIG. 22.

The method may continue as shown in FIG. 22, by determining a difference between the liquid-to-vapor transition temperature and the minimum sensed temperature of the refrigerant at the evaporator coil outlet, if any, at step 316. The method proceeds to determine an optimum control set point at step 318, based on the difference between the liquid-to-vapor transition temperature and said minimum sensed temperature of the refrigerant at the evaporator coil outlet, if any. Lastly, the method concludes at step 322 by determining, based on the optimum control set point, a second optimum valve opening area for establishing a flow rate of refrigerant that maintains the oscillating temperature of the refrigerant at an optimum level in which the minimum sensed temperature of the refrigerant at the evaporator coil outlet within a fraction of the oscillation amplitude "A" from the liquid-to-vapor transition.

Figure 23:
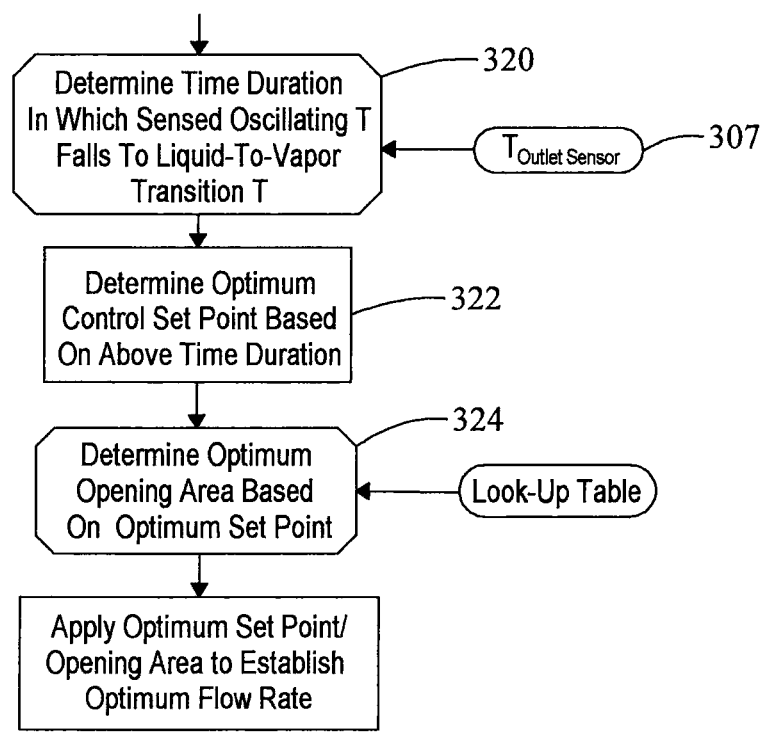
FIG. 23 is a flow chart of one embodiment of a determination of an optimum setting for the method in FIG. 22.
Figure 24:
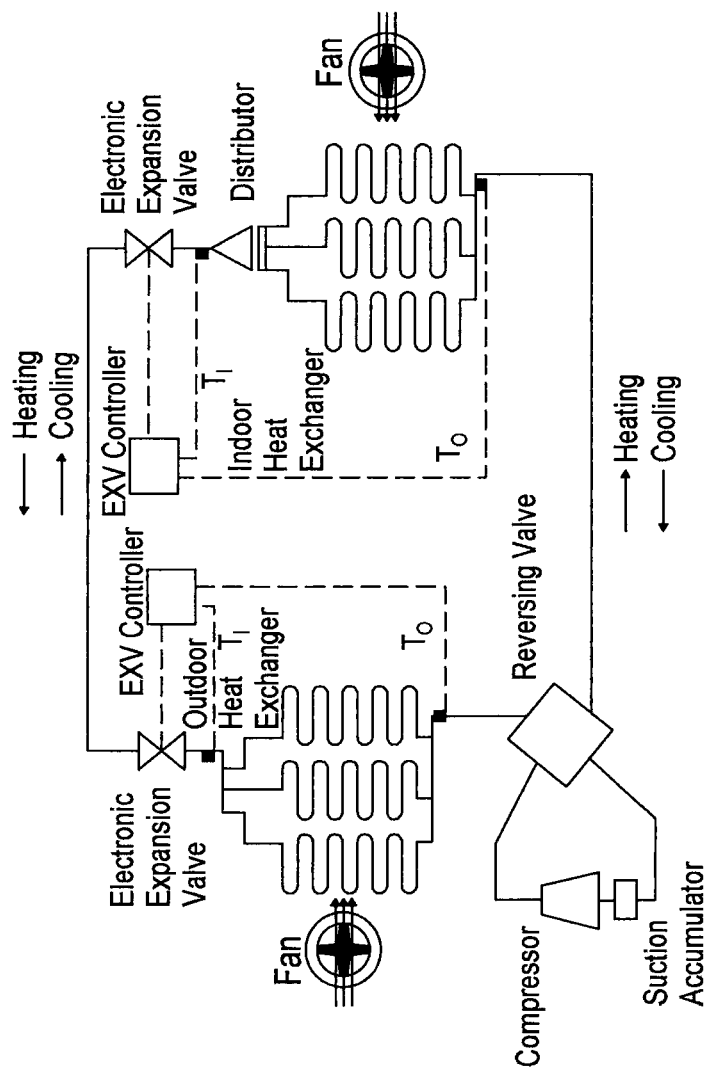
FIG. 24 is a diagram of one embodiment of an air conditioner and a heat pump.

Similarly, the method may continue as shown in FIG. 23, by determining a duration of time in which the oscillating temperature of the refrigerant at the outlet of the evaporator coil falls to the liquid-to-vapor transition temperature of the refrigerant, if any, at step 320. The method proceeds to determine an optimum control set point at step 322, based on the duration in which the oscillating temperature of the refrigerant at the outlet of the evaporator coil falls to the liquid-to-vapor transition temperature of the refrigerant, if any. Lastly, the method concludes at step 324 by determining, based on the optimum control set point, a second optimum valve opening area for establishing a flow rate of refrigerant that maintains the oscillating temperature of the refrigerant at an optimum level in which the minimum sensed temperature of the refrigerant at the evaporator coil outlet within a fraction of the oscillation amplitude "A" from the liquid-to-vapor transition, and the oscillating temperature of the refrigerant at the evaporator coil outlet does not fall to the liquid-to-vapor transition temperature for more than a time duration of one quarter of the period of the temperature oscillation frequency.

Figure 25:
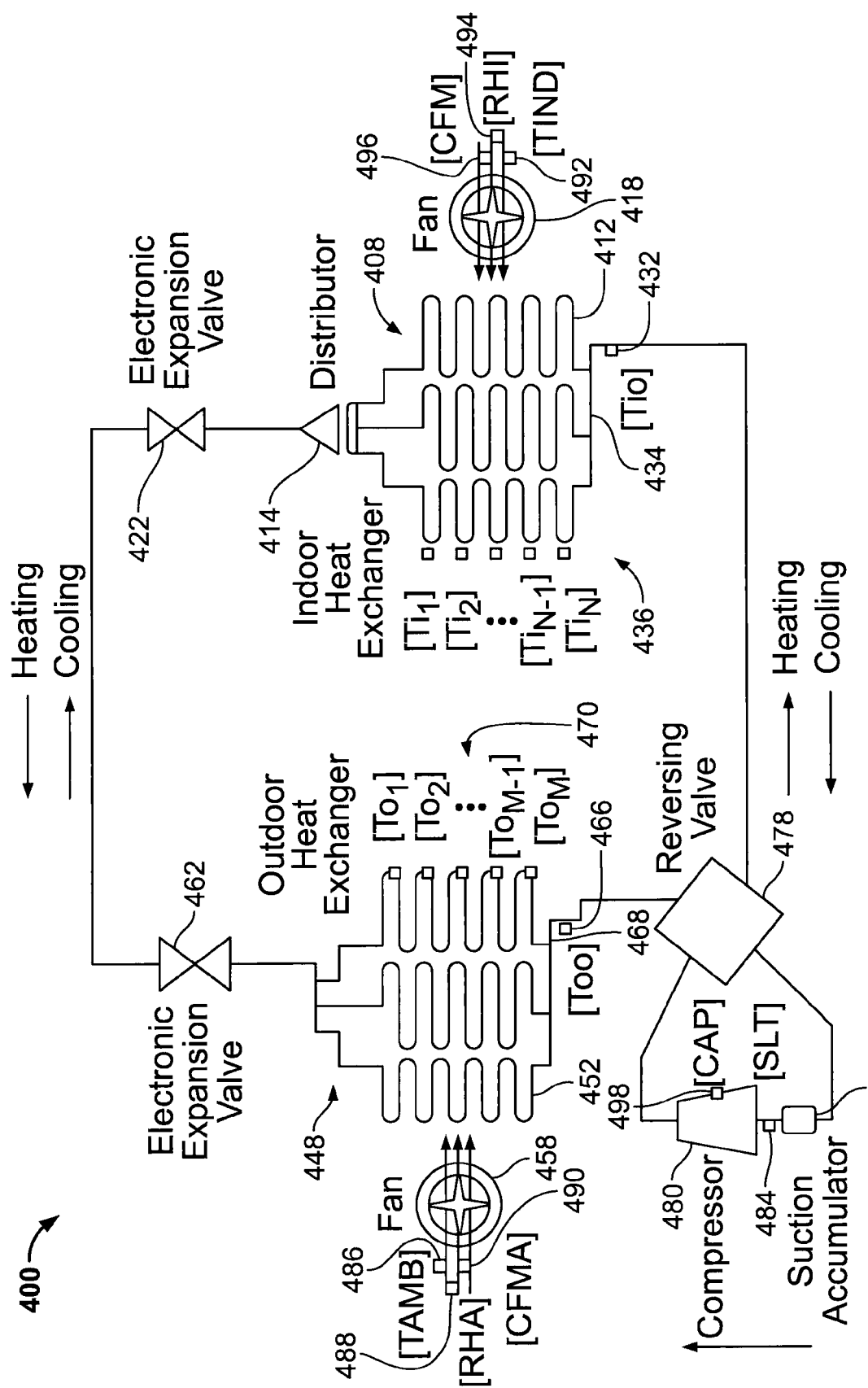
FIG. 25 is a diagram of an exemplary embodiment of a climate control system.

One embodiment of a climate control system is indicated generally in FIG. 25 by reference number 400. The climate control system 400 is reversible in that it can operate in a heating mode or in a cooling mode. The climate control system 400 includes an indoor heat exchanger 408 having a plurality of evaporator coils 412 and a distributor 414. The system 400 also includes an indoor fan 418, an indoor electronic expansion valve 422, and a temperature sensor 432 for sensing a temperature Tio near an outlet 434 of the evaporator coils 412. A plurality of temperature sensors 436 are mounted on and are spaced along the evaporator coils 412 to sense temperatures $Ti_1$ through $Ti_N$.

The climate control system 400 also includes an outdoor heat exchanger 448 having a plurality of evaporator coils 452. The system 400 provides an outdoor fan 458, an outdoor electronic expansion valve 462, and a temperature sensor 466 for sensing a temperature Too near an outlet 468 of the evaporator coils 452. A plurality of temperature sensors 470 are mounted on and are spaced along the evaporator coils 452 to sense temperatures $To_1$ through $To_N$. Between the heat exchangers 408 and 448 are provided a reversing valve 478, a compressor 480, and a suction accumulator 482, along with refrigerant lines and other components (not shown).

The temperature sensors 436 and 470 facilitate control, by one or more controllers, of the indoor expansion valve 422 and outdoor expansion valve 462. Other or additional sensors may be provided, e.g., a temperature sensor 484 for sensing compressor suction line temperature (SLT), a sensor 486 for sensing outdoor temperature (TAMBI), a sensor 488 for sensing outdoor relative humidity (RHA), a sensor 490 for sensing outdoor air flow rate (CFMA), a sensor 492 for sensing indoor temperature (TIND), a sensor 494 for sensing indoor relative humidity (RHI), and a sensor 496 for sensing indoor air flow rate (CFMI). A sensor 498 is also provided for sensing compressor capacity (CAP).

Figure 26:
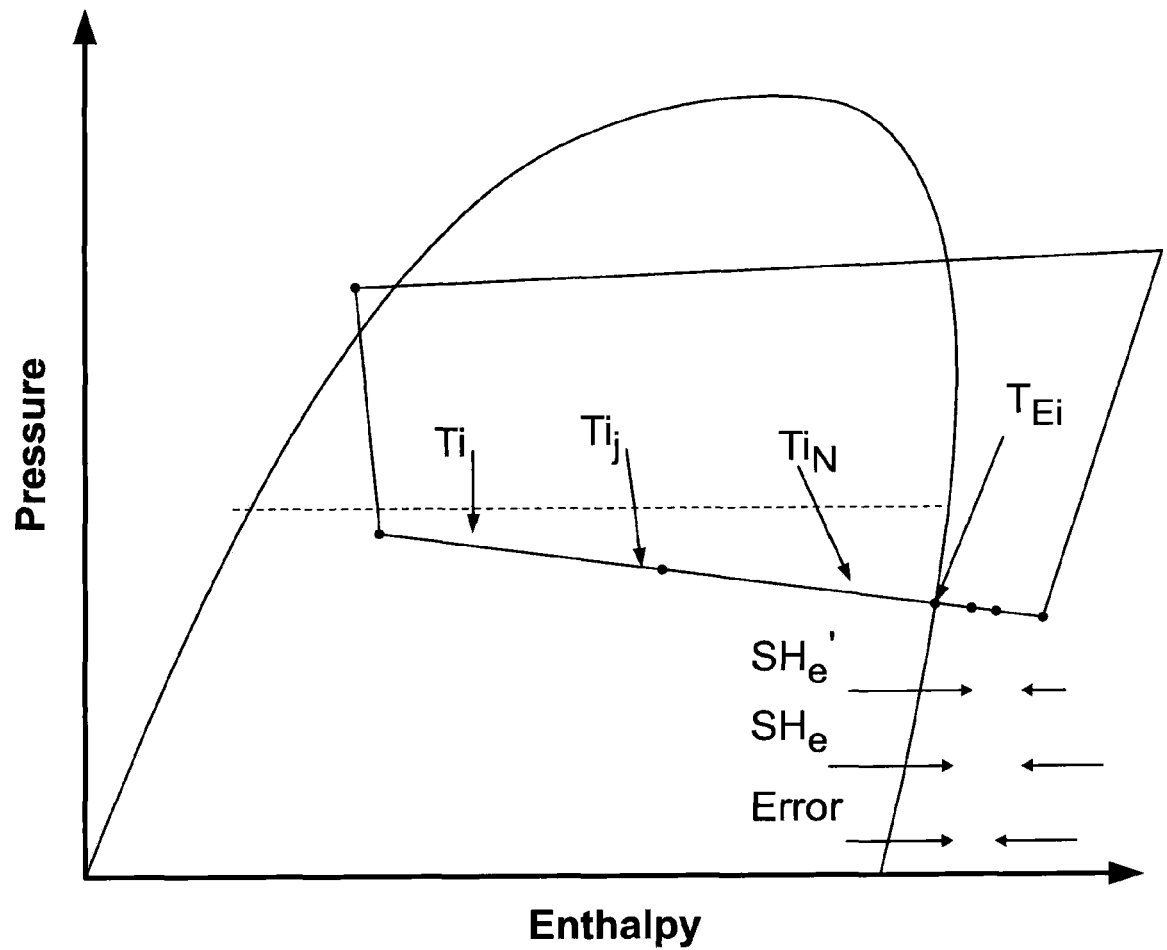
FIG. 26 is a graph of pressure relative to enthalpy for temperature sensing by an exemplary embodiment of a temperature sensing array of an indoor heat exchanger.
Figure 27:
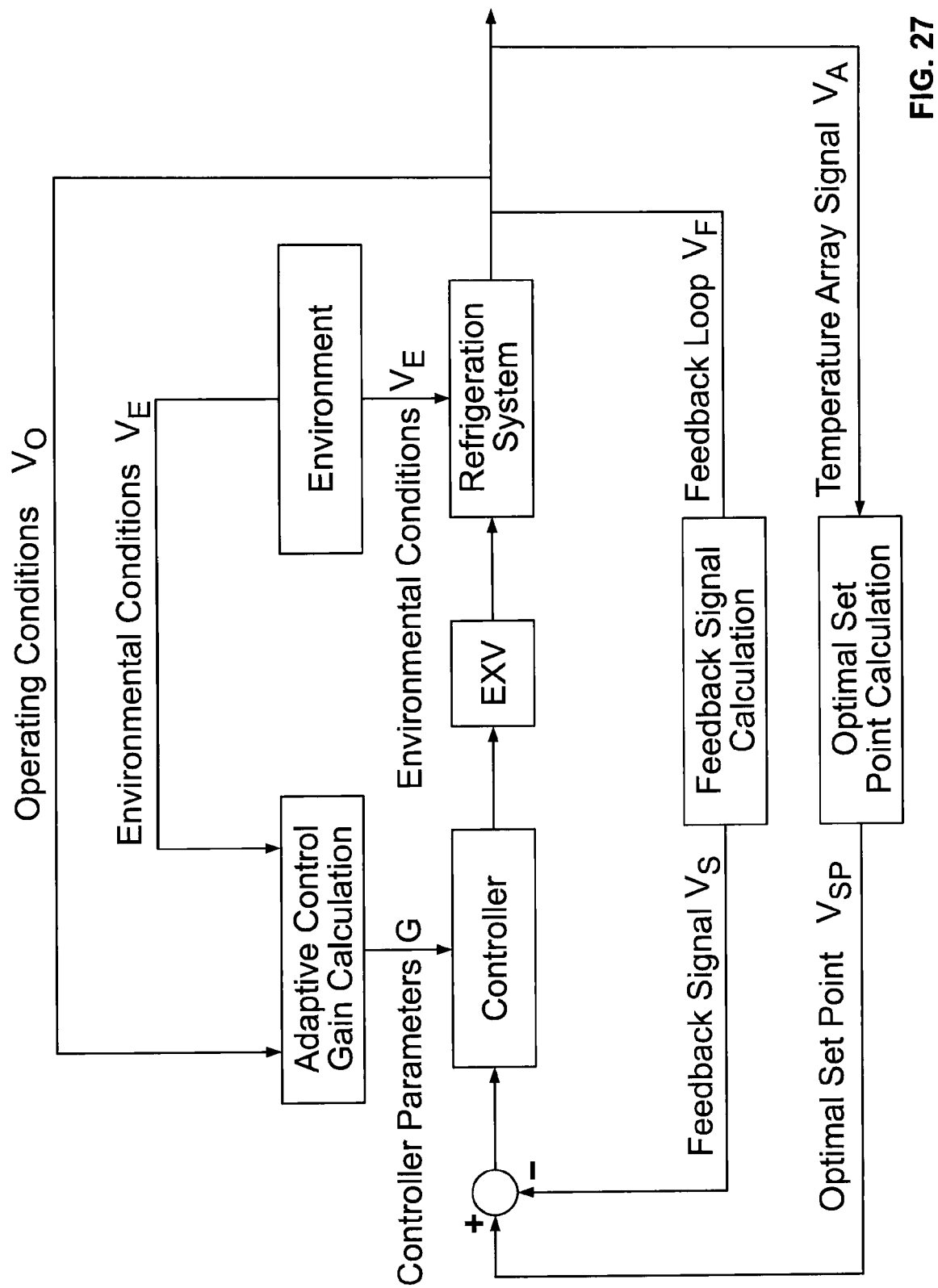
FIG. 27 is a block diagram of an exemplary embodiment of a system for controlling an expansion valve.

As shown in FIG. 26, the temperature sensors 436 can be used to determine the saturating temperature $TE_i$ at the outlet 434 of the indoor evaporator coils 412, where $TE_i$ is a function of temperatures ($Ti_1$, $Ti_2$, ... $Ti_N$). In the same or a similar manner, the temperature sensors 470 can be used to determine the saturating temperature $TE_o$ at the outlet 468 of the outdoor evaporator coils 452, where $TE_o$ is a function of ($To_1$, $To_2$, ... $To_N$). In one exemplary embodiment of a control system, and as shown in FIG. 27, the following signals and signal vectors are used as shown in Table 1 for driving an expansion valve stepper motor for a control-system-calculated number of steps.

TABLE 1

Operating Conditions Vector Vo = [CAP, CFMI, CFMA]
Environmental Conditions Vector $V_E$ = [TIND, RHI, TAMB, RHA]
Controller Parameters Vector G = [K, Tu] (K representing controller feedback gain, Tu representing controller update time)
Feedback Loop Vector $V_F$ = [SLT, $TE_i$]
Feedback Signal $V_S$ = SLT – $TE_i$ (a scalar)
Temperature Array Signal Vector $V_A$ = [$Ti_1$, $Ti_2$, ... $Ti_N$]
Optimal Set Point $V_{SP}$ (a scalar, calculated to maximize operating efficiency)

Figure 28:
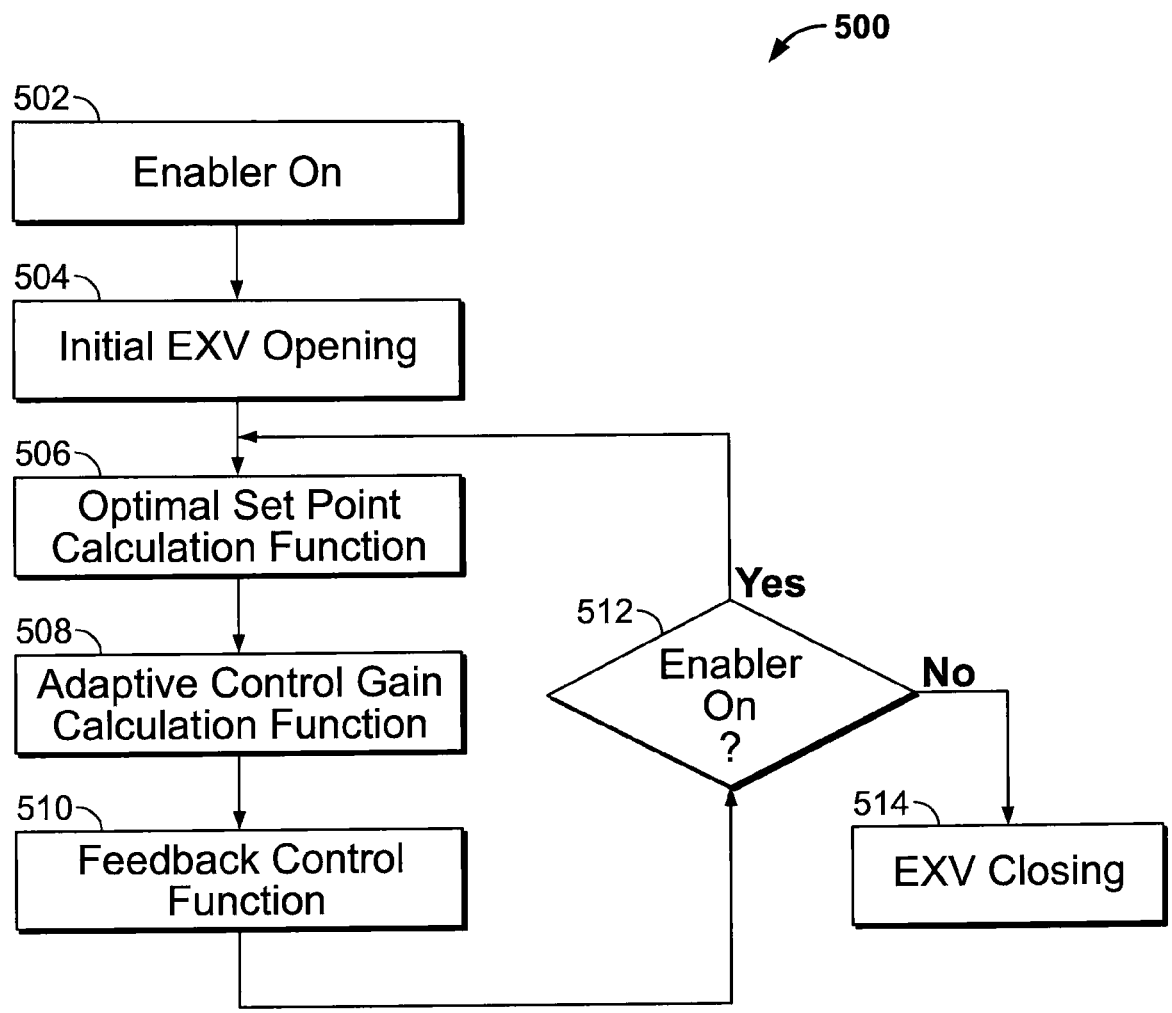
FIG. 28 is a flow diagram of an exemplary embodiment of a method of controlling an expansion valve.
Figure 29:
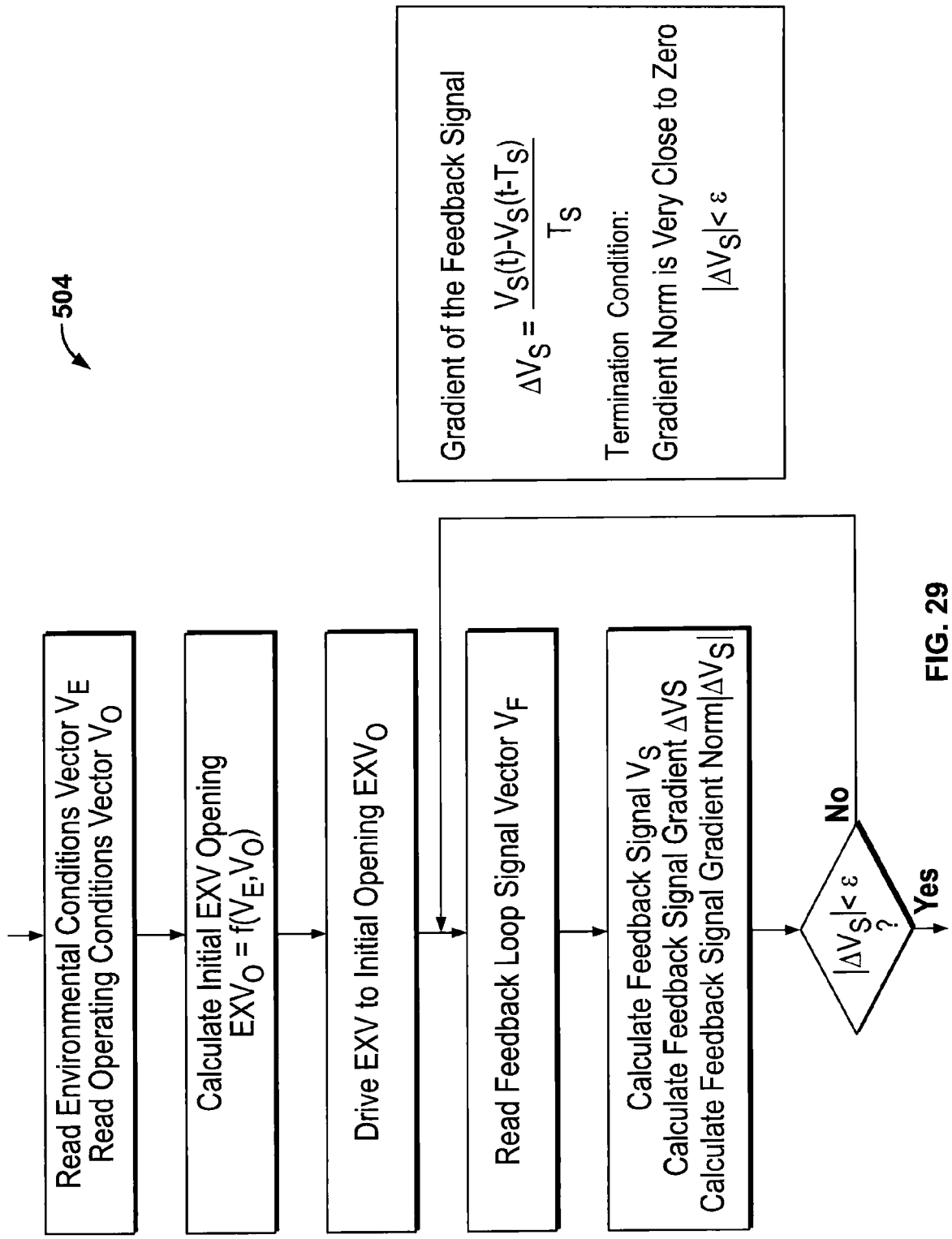
FIG. 29 is a flow diagram of an exemplary embodiment of a method of opening an expansion valve.
Figure 30:
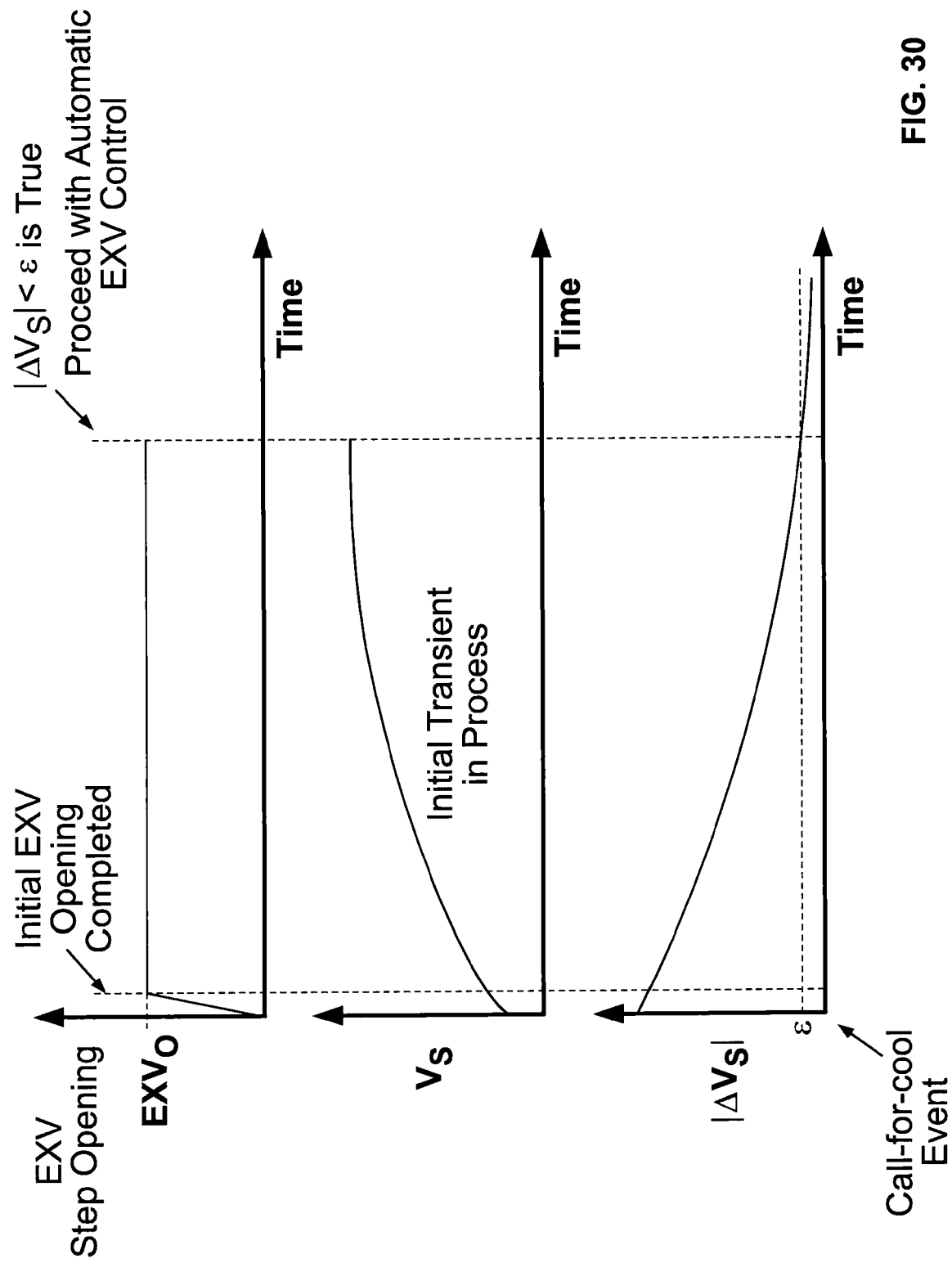
FIG. 30 is a diagram of refrigeration system behaviors in relation to an exemplary embodiment of a method of opening an expansion valve.

In one embodiment, the climate control system 400 may perform a control algorithm indicated in FIG. 28 by reference number 500. When, e.g., a call for "cool" is detected and an "ENABLER ON" signal 502 is valid, an initial routine 504 is performed to open the expansion valve 422. The valve opening routine 504 is shown in greater detail in FIG. 29, and system behaviors are shown in FIG. 30. The initial opening may be calculated to minimize the length of initial transient. The expansion valve 422 remains at an initial position $EXV_O$, e.g., until the initial startup transient is completed in order to minimize control effort.

Figure 31:
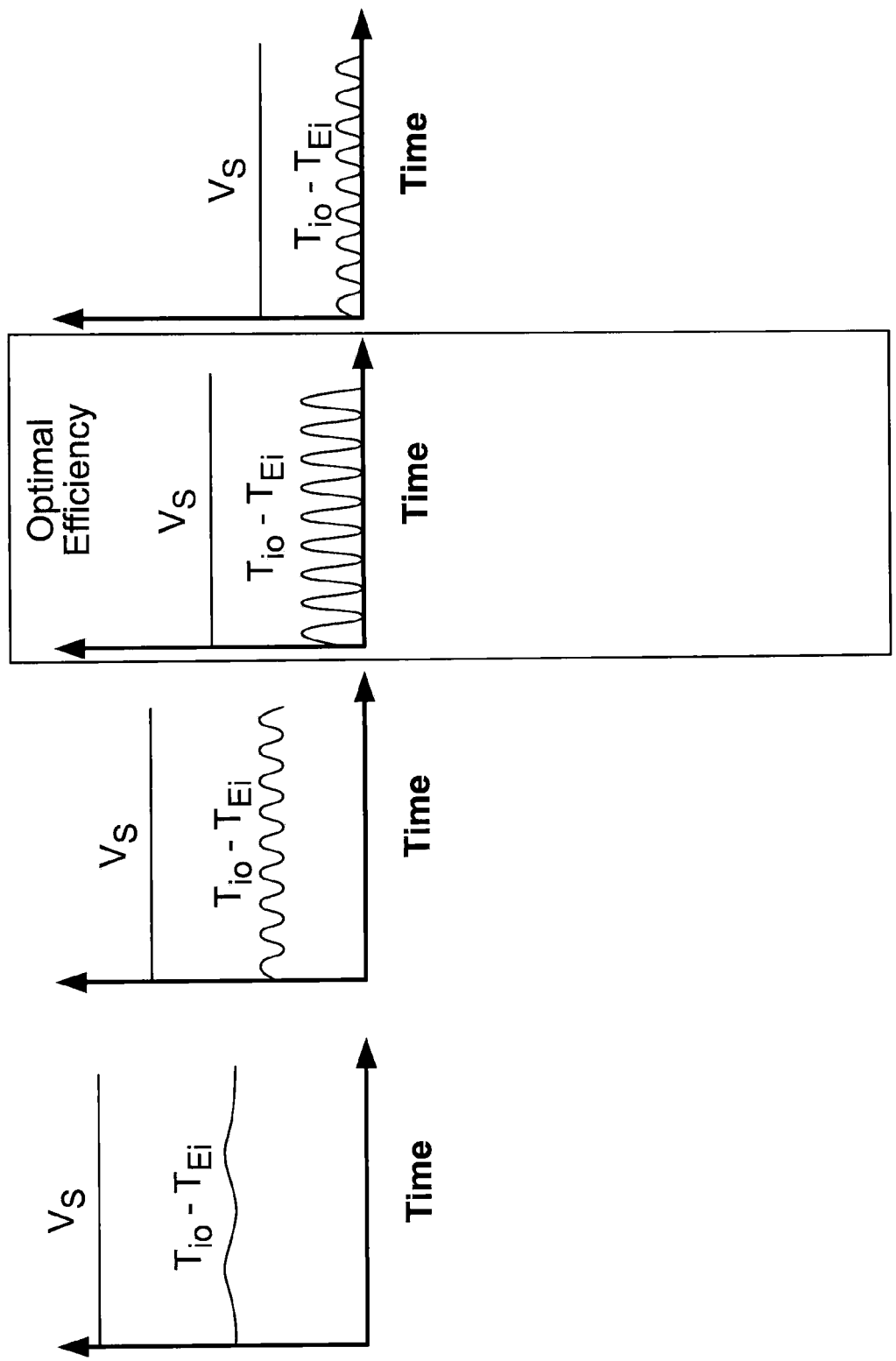
FIG. 31 is a diagram of a relationship between an optimal set point and a liquid-to-vapor transition in an exemplary embodiment.
Figure 32:
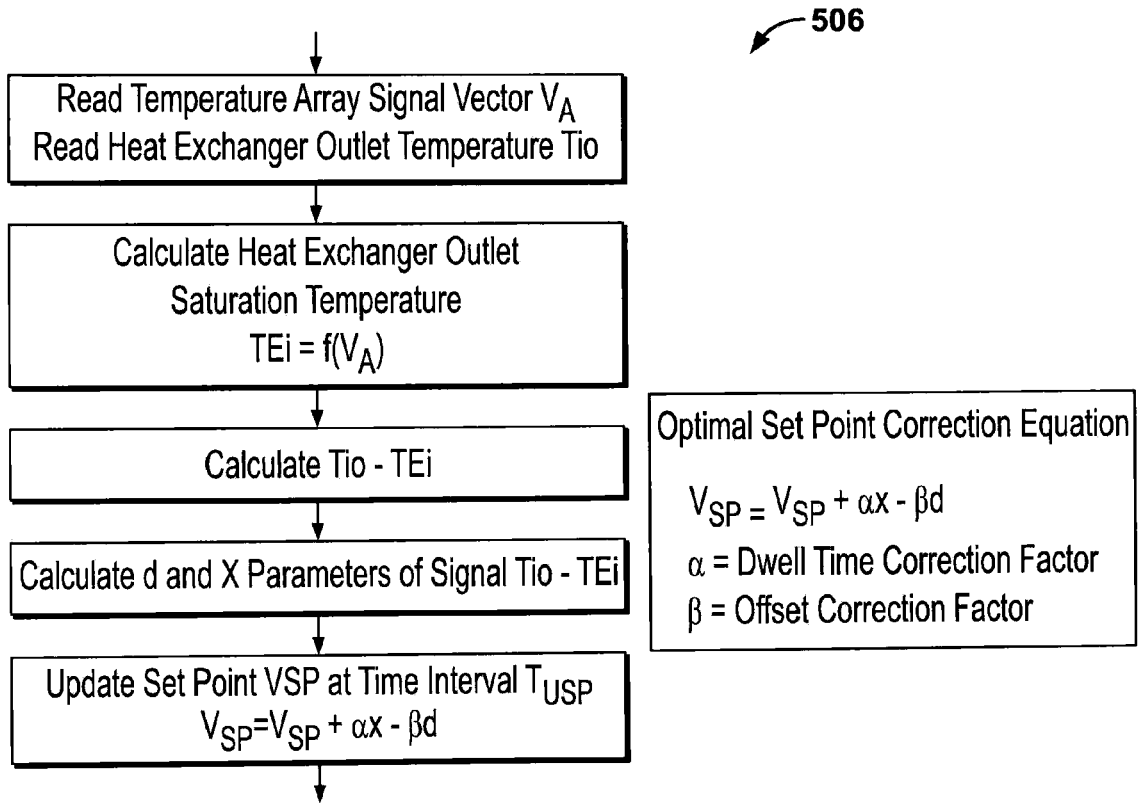
FIG. 32 is a flow diagram of an exemplary embodiment of a method of calculating an optimal set point.

Referring again to FIG. 28, while the "ENABLER ON" signal 502 is valid, the algorithm 500 loops as follows. An optimal set point calculation function 506 may be performed to drive the control set point feedback signal $V_s$ to an optimal set point value $V_{SP}$ to optimize, e.g., operating efficiency of the indoor heat exchanger 408. As shown in FIG. 31 and as previously discussed in relation to FIG. 13, in various embodiments it is desirable to place a liquid-to-vapor transition point at the evaporator coil outlet 434. The optimal set point calculation function 506 is shown in greater detail in FIG. 32.

Figure 33:
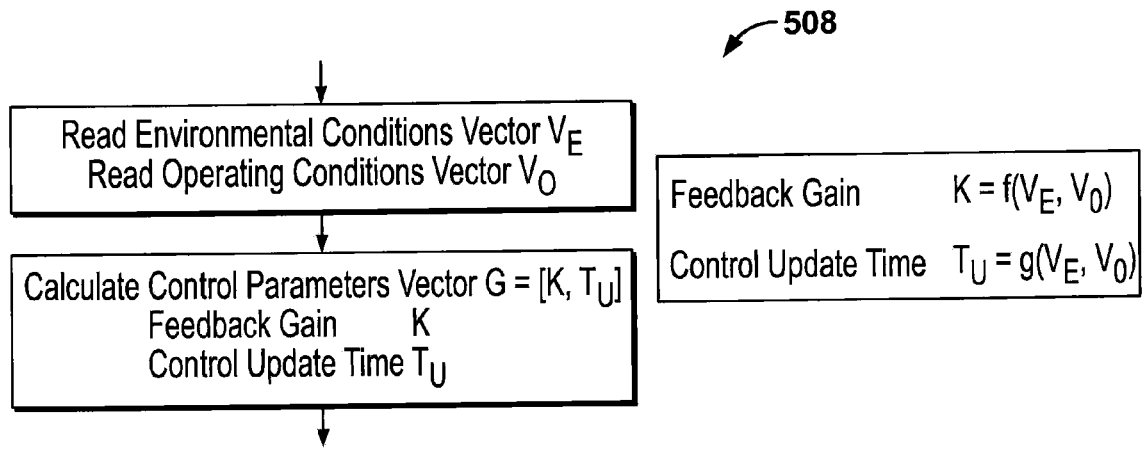
FIG. 33 is a flow diagram of an exemplary embodiment of a method of calculating adaptive control gain.
Figure 34:
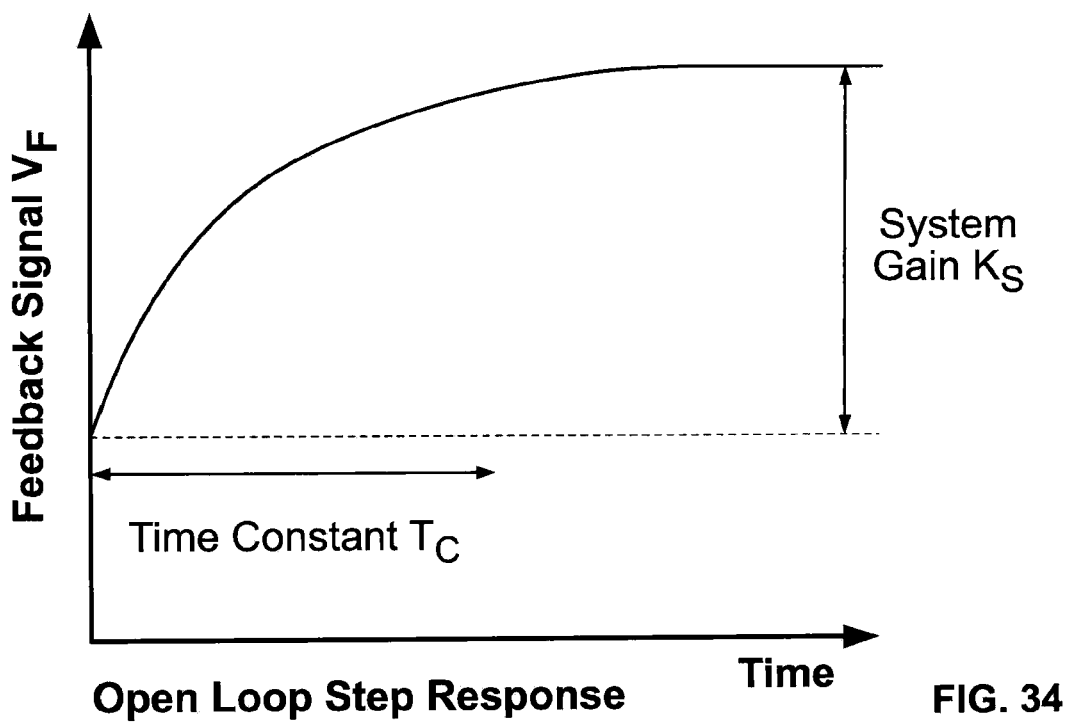
FIG. 34 is a graph of an open loop step response in an exemplary embodiment of a system for controlling an expansion valve.

Referring again to FIG. 28, an adaptive control gain calculation function 508 is performed to calculate control parameters G=[K, $T_U$] as a function of environmental and operating conditions. The adaptive control gain calculation function 508 is shown in greater detail in FIG. 33. An open loop step response is shown in FIG. 34. Control parameters may be calculated, e.g., based on dynamic parameters of the climate control system 400 at a given condition. For example, the controller feedback gain K is the inverse of system gain $K_S$ and controller update time Tu is equal to a system time constant Tc.

Figure 35:
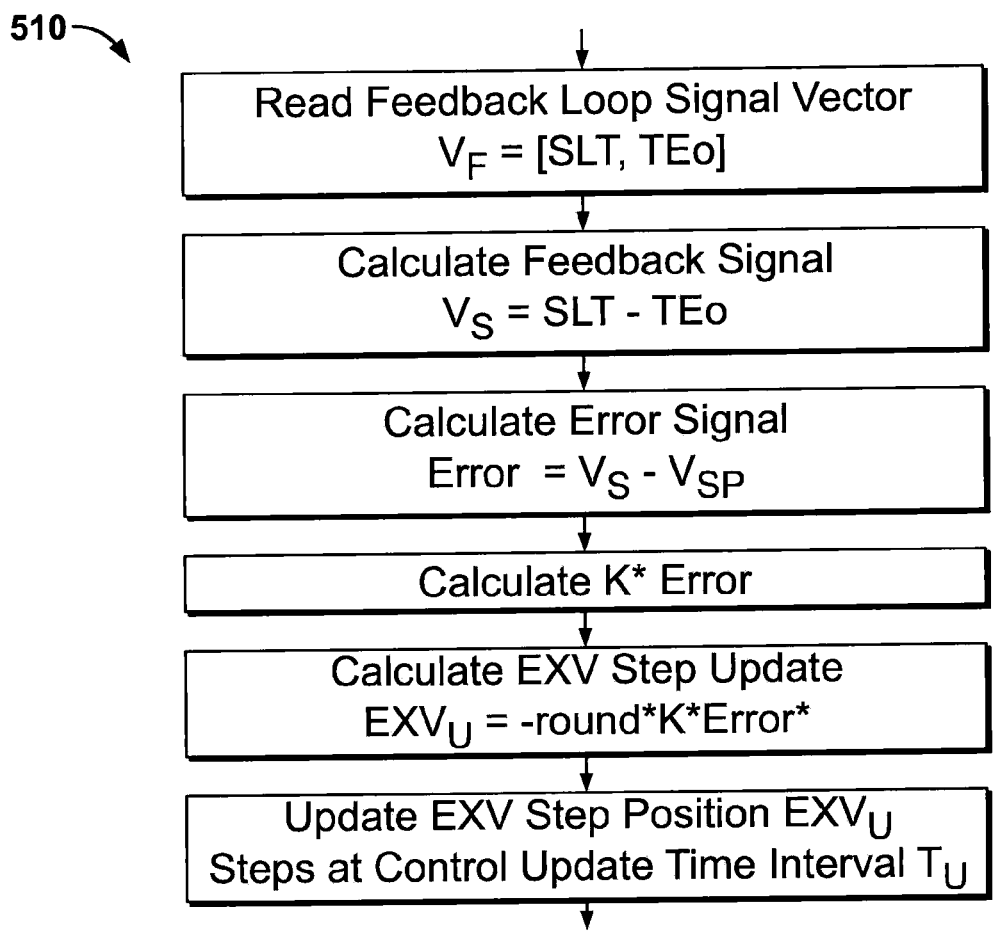
FIG. 35 is a flow diagram of an exemplary embodiment of a method of providing feedback control.
Figure 36:
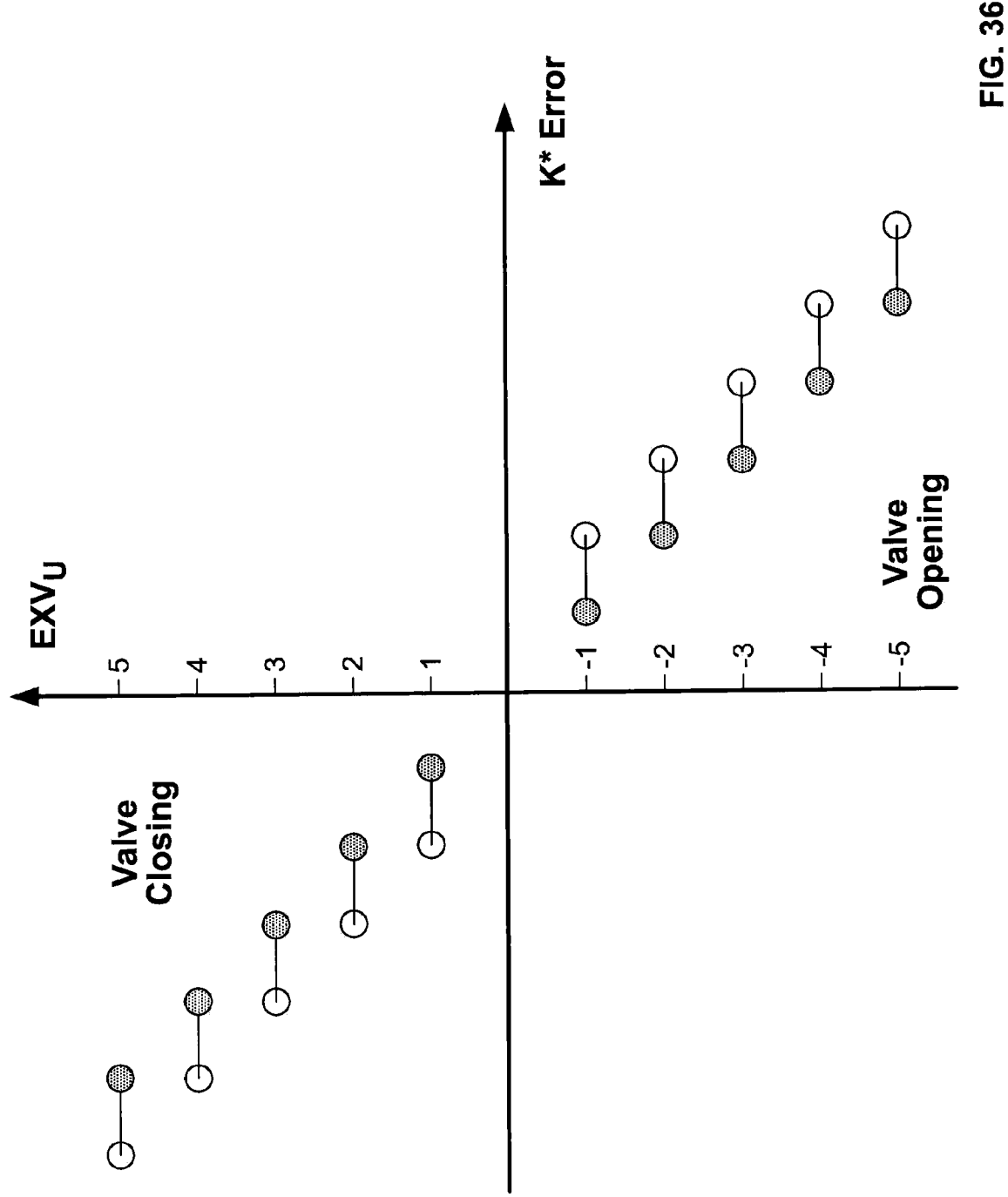
FIG. 36 is a graph of an exemplary embodiment of a method of updating a number of stepper motor steps for an expansion valve.

Referring again to FIG. 28, a feedback control function 510 is performed to calculate steps for the expansion valve 422 to drive the feedback signal $V_S$ to the set point $V_{SP}$. One embodiment of the feedback control function 510 is shown in greater detail in FIG. 35. The desired number of steps for the expansion valve 422 to take ($EXV_U$) is a function of a signal K*error, as shown in FIG. 36. When the "ENABLER ON" signal expires 512, a routine 514 is performed in order to close the expansion valve 422.

In various embodiments, various sensor inputs and modulating actuators can be used to control an expansion valve, e.g., the expansion valves 422 and/or 462 shown in FIG. 25. Modulating actuators, which are capable of having their outputs adjusted by means of a modulating scheme, include but are not limited to the expansion valves 422 and/or 462, the compressor 480, and/or the fans 418 and 458. Degrees of opening of the expansion valves 422 and/or 462 may be adjusted to regulate the flow of refrigerant. The speed (e.g., in revolutions per minute) and/or load/unload duty cycle of the compressor 480 may be modulated to regulate refrigeration capacity of the climate control system 400. The speeds of the indoor fan 418 and/or outdoor fan 458 may be modulated to adjust air flow rates respectively across the indoor and outdoor heat exchangers 408 and 448. Sensor inputs that may be monitored for use in controlling an expansion valve 422 or 462 include but are not limited to inputs from the temperature sensors 432, 436, 466, 470, 484, 486, and/or 492, humidity sensors 488 and/or 494, air flow rate sensors 490 and/or 496, and/or compressor capacity sensor 498.

In various embodiments, one or more components of the climate control system 400 may be used to cause perturbation of refrigerant flow through, e.g., the expansion valve 422. The perturbation results in refrigerant temperature oscillations that evolve during a process for controlling the expansion valve 422. As the temperature oscillations evolve, a temperature offset value d and/or a dwell time x also may change accordingly. The expansion valve 422 can be controlled to drive the offset and dwell time values to zero. Under such conditions, the refrigerant liquid-to-vapor transition point is driven to close proximity to the outlet 434 of the evaporator coils 412.

Figure 37:
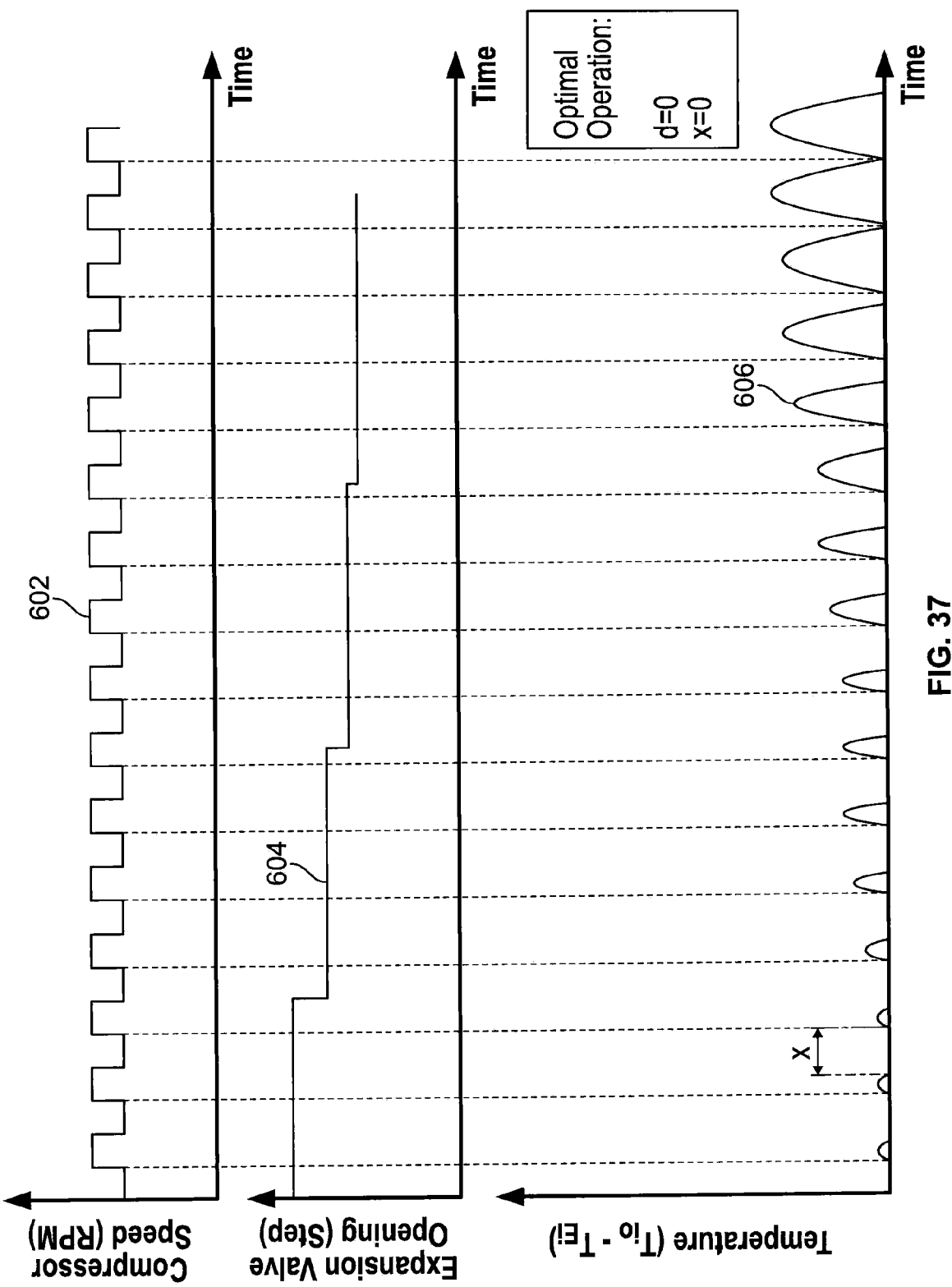
FIG. 37 is a timing diagram of an exemplary embodiment of using a compressor speed duty cycle in control of an expansion valve.
Figure 43:
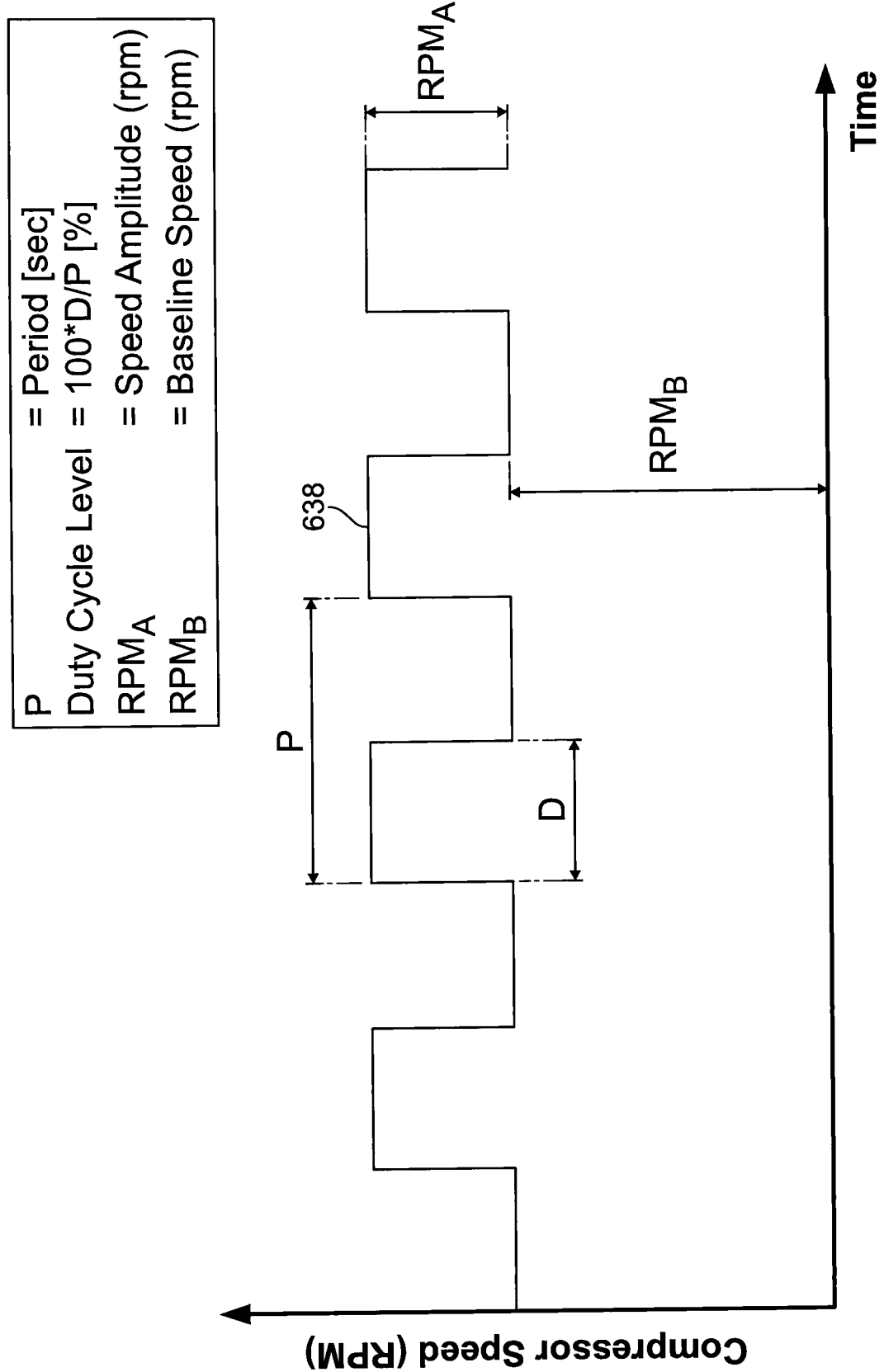
FIG. 43 is a timing diagram of an exemplary embodiment of a compressor speed duty cycle.

In an example embodiment shown in FIG. 37, a variable-speed compressor speed duty cycle 602 is used to produce a refrigerant flow perturbation resulting in refrigerant temperature oscillations. As shown in FIG. 43, such a duty cycle may be implemented as a square wave 638 having a period P, a duty cycle level D/P, a speed amplitude $RPM_A$, and a baseline speed $RPM_B$. With reference to FIG. 37, the foregoing parameters may be substantially continuously controlled to induce oscillations in a temperature difference signal 606. An opening 604 of the expansion valve 422 may be controlled in order to drive the climate control system 400, e.g., to an optimal efficiency operating condition. The temperature difference signal 606 (e.g., $T_{io}-T_{Ei}$) evolves as the expansion valve 422 is controlled. As the expansion valve opening 604 is progressively reduced, the temperature difference signal 606 ($T_{io}-T_{Ei}$) oscillations evolve. A dwell time x also changes accordingly. An offset value d remains at zero, whereas the dwell time x is continuously decreased until it reaches zero. Optimal operation of the climate control system 400 may be achieved when the dwell time x and the offset value d are substantially near zero. Under such conditions, the refrigerant liquid-to-vapor transition point is driven to close proximity to the evaporator heat exchanger outlet 434, resulting in optimal efficiency operation of the climate control system 400.

Figure 38:
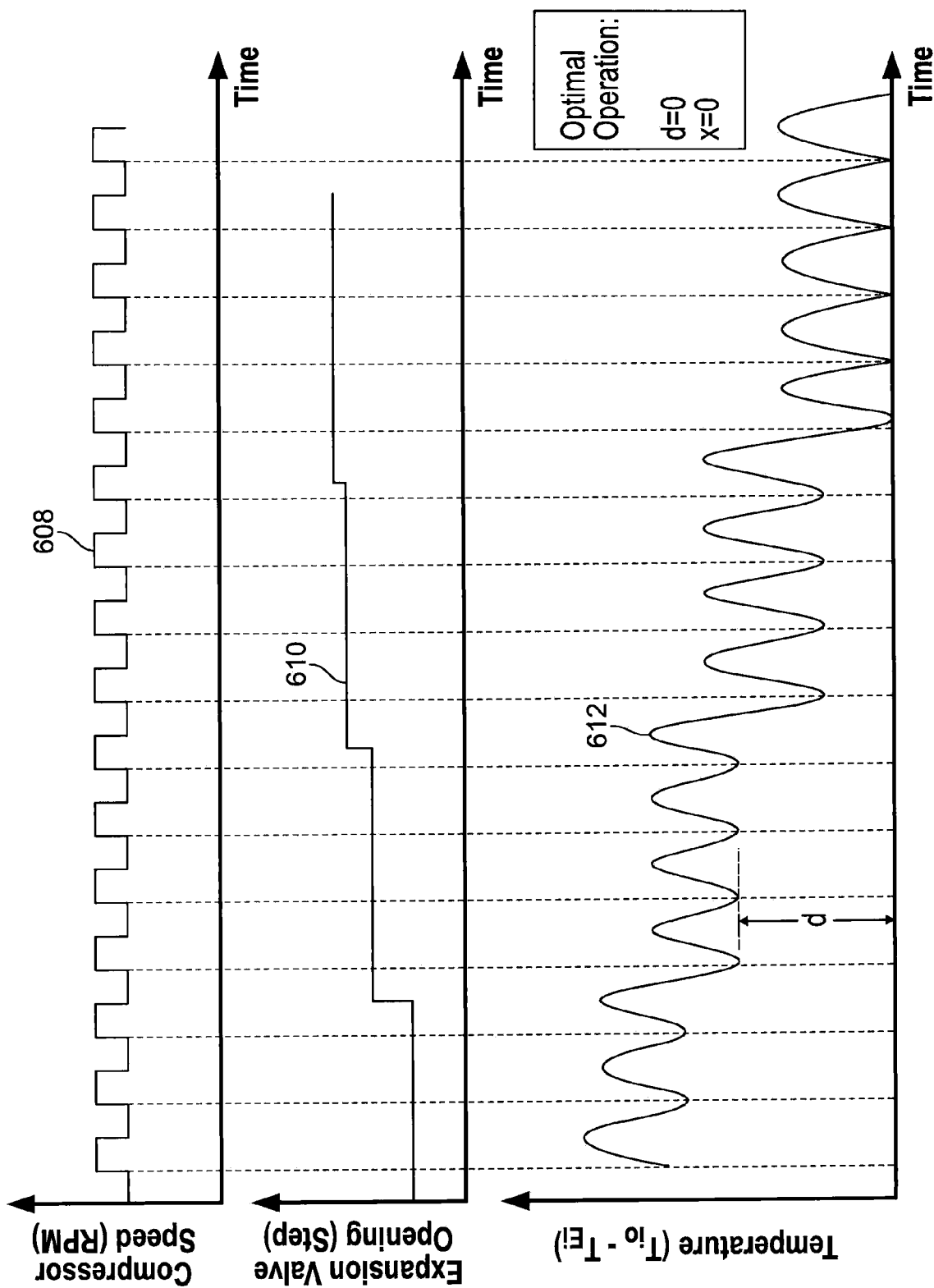
FIG. 38 is a timing diagram of an exemplary embodiment of using a compressor speed duty cycle in control of an expansion valve.

In an example embodiment shown in FIG. 38, a compressor speed duty cycle 608 is used to produce a refrigerant flow perturbation resulting in refrigerant temperature oscillations. An opening 610 of the expansion valve 422 may be controlled in order to drive the climate control system 400, e.g., to an optimal efficiency operating condition. A temperature difference signal 612 (e.g., $T_{io}-T_{Ei}$) evolves as the expansion valve 422 is controlled. In the present example embodiment, the temperature difference signal 612 is used for feedback control of the valve opening 610, e.g., as previously discussed with reference to FIGS. 28 and 35. As the expansion valve opening 610 is progressively increased, the temperature difference signal 612 ($T_{io}-T_{Ei}$) oscillations evolve toward zero. An offset value d progressively decreases to zero, and dwell time x remains substantially at zero. Optimal operation of the climate control system 400 may be achieved when the dwell time x and the offset value d are substantially near zero. Under such conditions, the refrigerant liquid-to-vapor transition point is driven to close proximity to the evaporator heat exchanger outlet 434, resulting in optimal efficiency operation of the climate control system 400.

Figure 44:
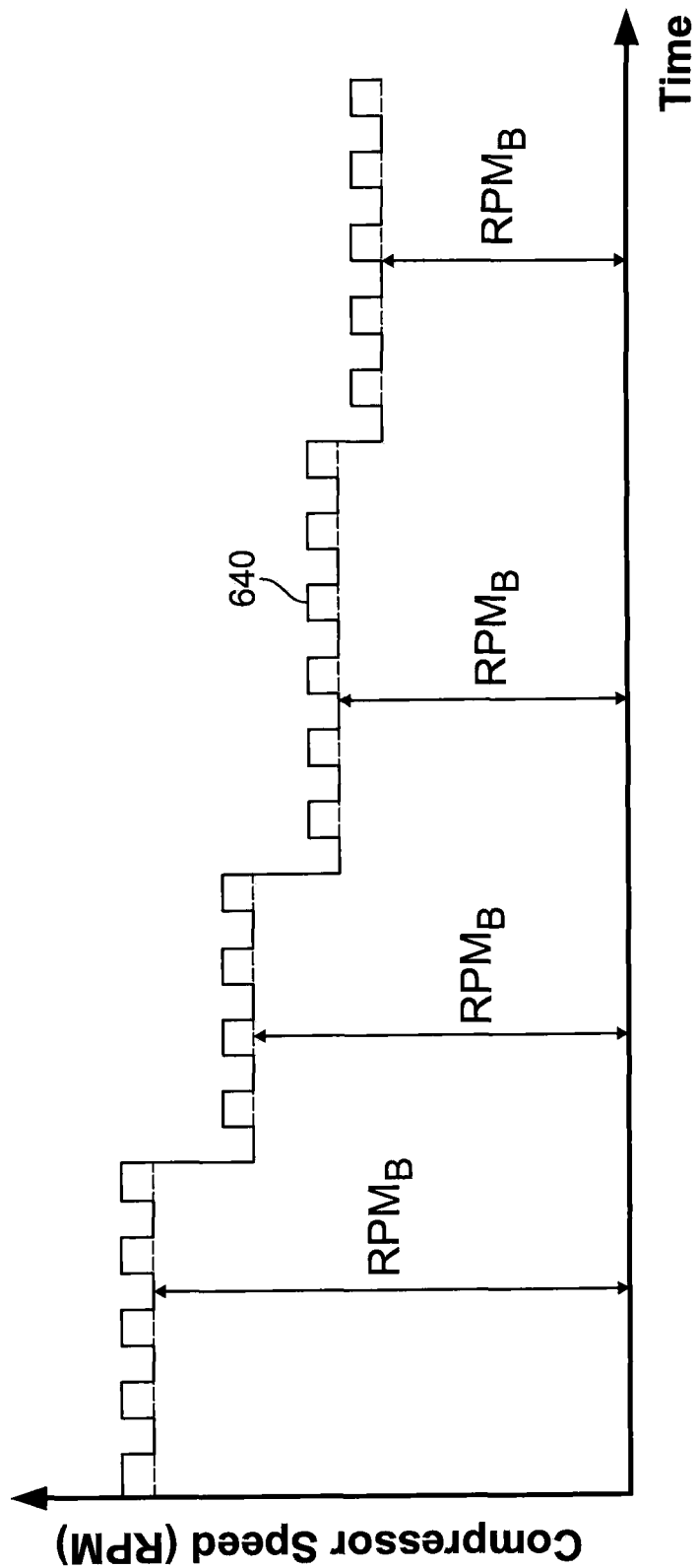
FIG. 44 is a timing diagram of an exemplary embodiment of a compressor speed duty cycle superimposed on compressor speed modulation.

As shown in FIG. 44, a curve 640 represents the compressor speed duty cycle, e.g., the square wave 642, superimposed on a compressor speed modulation process. A climate control system may gradually adjust compressor speed by progressively changing baseline speed $RPM_B$. Such changes may be configured to closely match a thermal load of the climate control system 400 to a refrigeration capacity delivered by the compressor.

Figure 39:
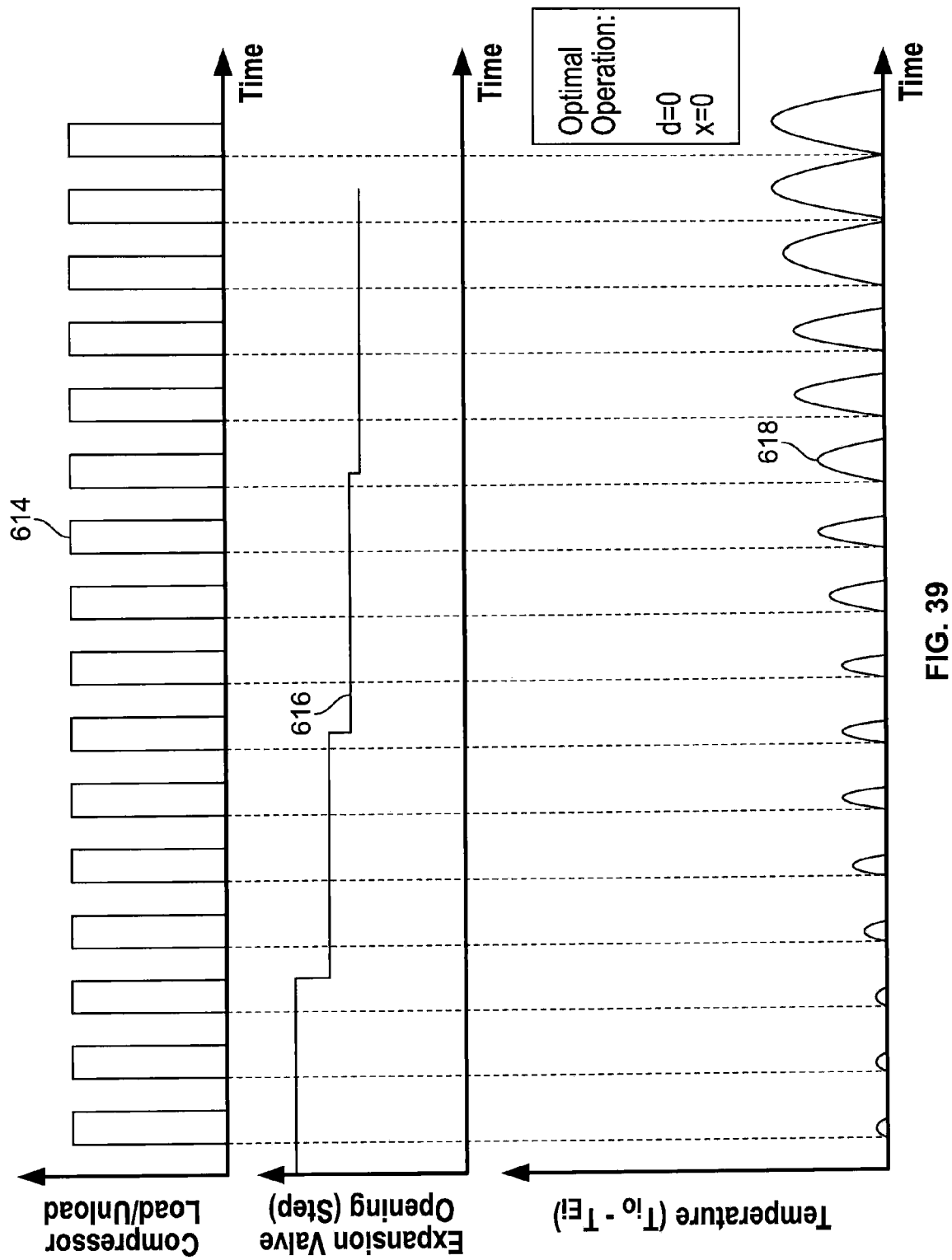
FIG. 39 is a timing diagram of an exemplary embodiment of using a compressor load/unload duty cycle in control of an expansion valve.

In an example embodiment shown in FIG. 39, a compressor load/unload duty cycle 614 is used to produce a refrigerant flow perturbation resulting in refrigerant temperature oscillations. Compressor modulation may be achieved, e.g., by continuously loading and unloading compression elements of the compressor 480. An opening 616 of the expansion valve 422 may be controlled in order to drive the climate control system 400, e.g., to an optimal efficiency operating condition. A temperature difference signal 618 (e.g., $T_{io}-T_{Ei}$) evolves as the expansion valve 422 is controlled. As the expansion valve opening 616 is progressively reduced to progressively and gradually close the expansion valve 422, the temperature difference signal 618 ($T_{io}-T_{Ei}$) oscillations evolve. A dwell time x also changes accordingly, in the same or a similar manner as previously discussed with reference to FIG. 37. An offset value d remains at zero, whereas the dwell time x is continuously decreased until it reaches substantially zero. Optimal operation of the climate control system 400 may be achieved when the dwell time x and the offset value d are substantially near zero. Under such conditions, the refrigerant liquid-to-vapor transition point is driven to close proximity to the evaporator heat exchanger outlet 434, resulting in optimal efficiency operation of the climate control system 400.

Figure 40:
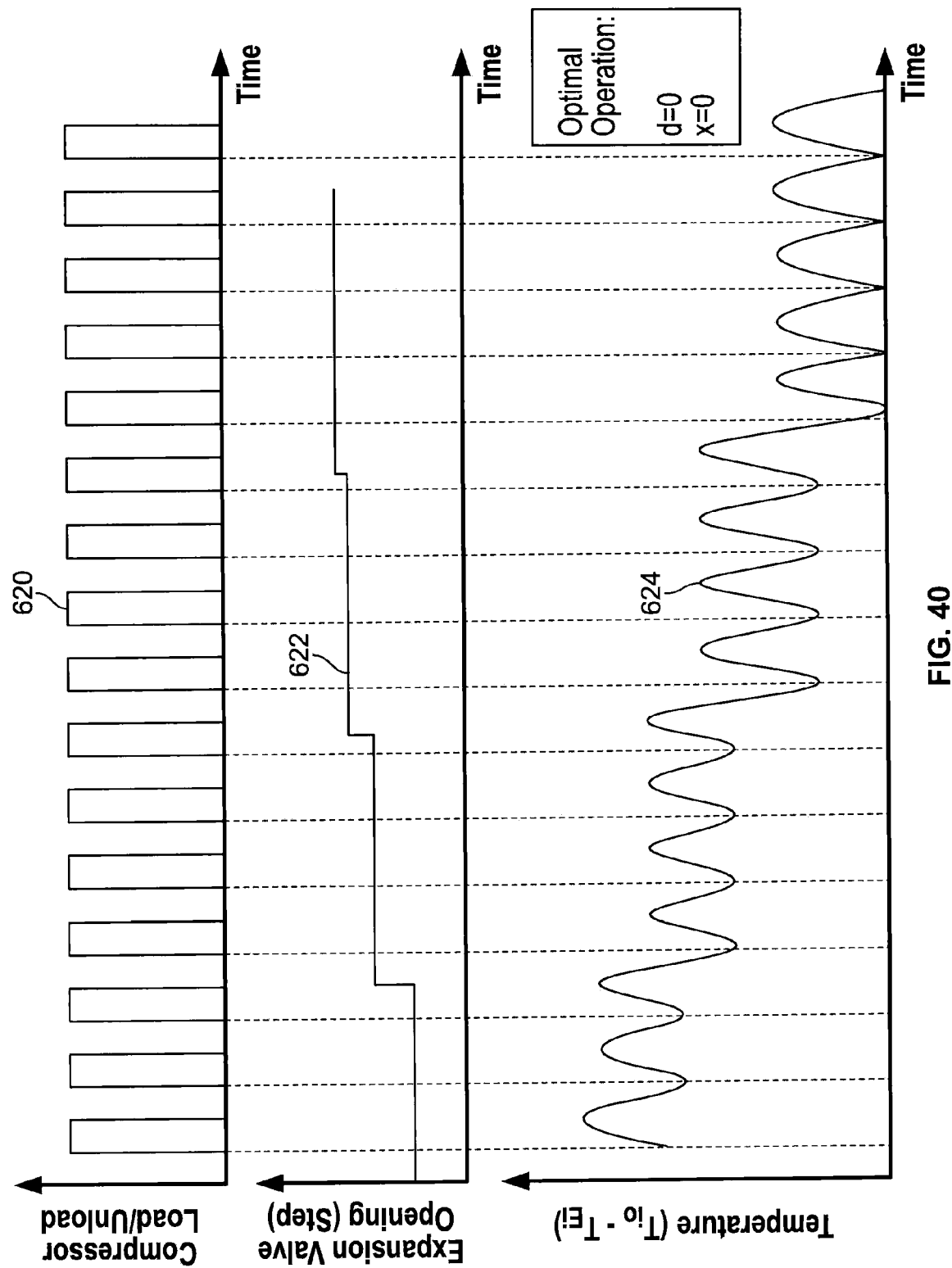
FIG. 40 is a timing diagram of an exemplary embodiment of using a compressor load/unload duty cycle in control of an expansion valve.

In an example embodiment shown in FIG. 40, a compressor load/unload duty cycle 620 is used to produce a refrigerant flow perturbation resulting in refrigerant temperature oscillations. Compressor modulation may be achieved, e.g., by continuously loading and unloading compression elements of the compressor 480. An opening 622 of the expansion valve 422 may be controlled in order to drive the climate control system 400, e.g., to an optimal efficiency operating condition. A temperature difference signal 624 (e.g., $T_{io}-T_{Ei}$) evolves as the expansion valve 422 is controlled. As the expansion valve opening 622 is progressively increased to progressively and gradually open the expansion valve 422, the temperature difference signal 624 ($T_{io}-T_{Ei}$) oscillations evolve toward zero. An offset value d progressively decreases to zero, in the same or a similar manner as previously discussed with reference to FIG. 38, and dwell time x remains substantially at zero. Optimal operation of the climate control system 400 may be achieved when the dwell time x and the offset value d are substantially near zero. Under such conditions, the refrigerant liquid-to-vapor transition point is driven to close proximity to the evaporator heat exchanger outlet 434, resulting in optimal efficiency operation of the climate control system 400.

Figure 41:
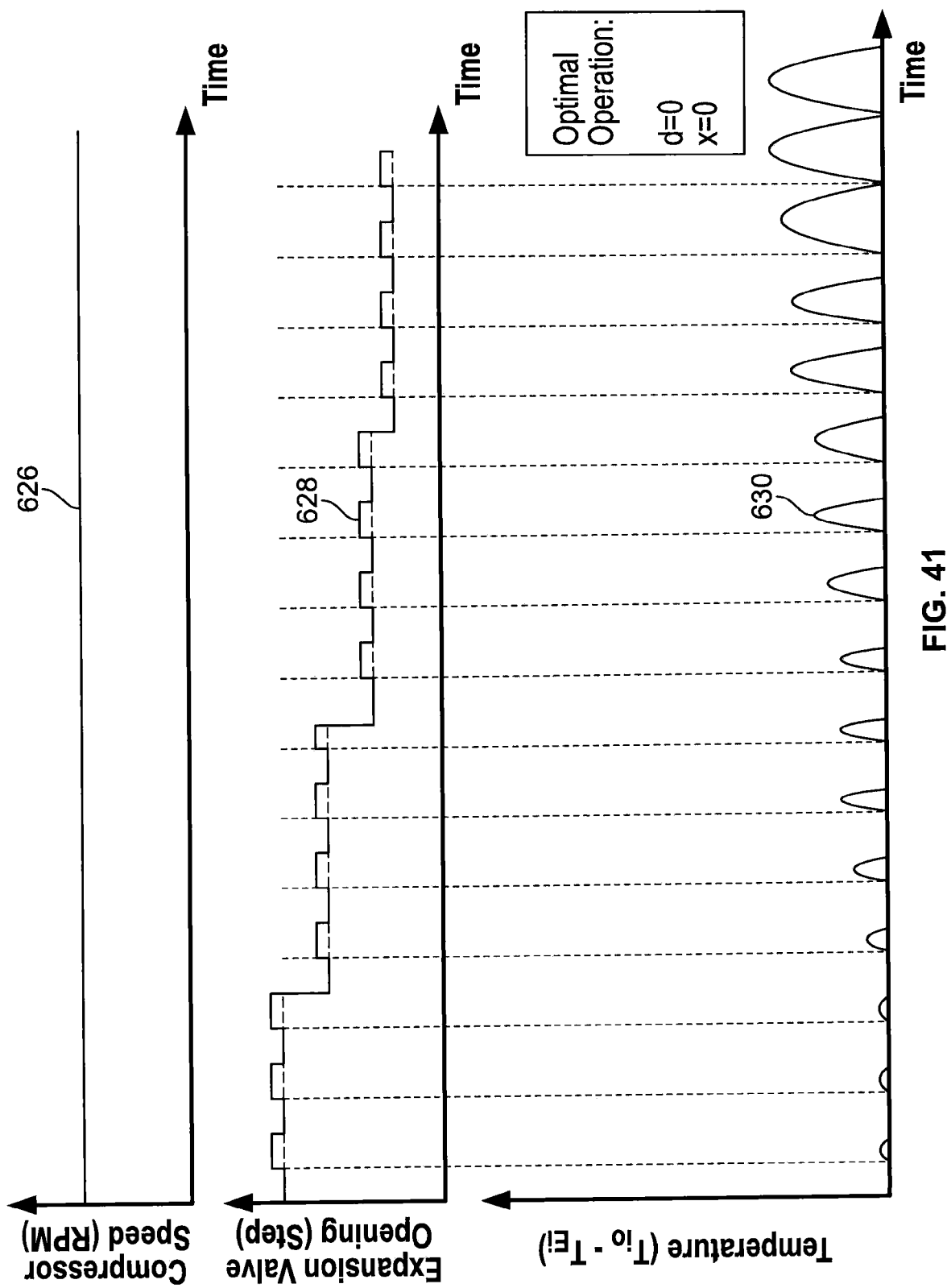
FIG. 41 is a timing diagram of an exemplary embodiment of using an expansion valve duty cycle in control of the expansion valve.
Figure 45:
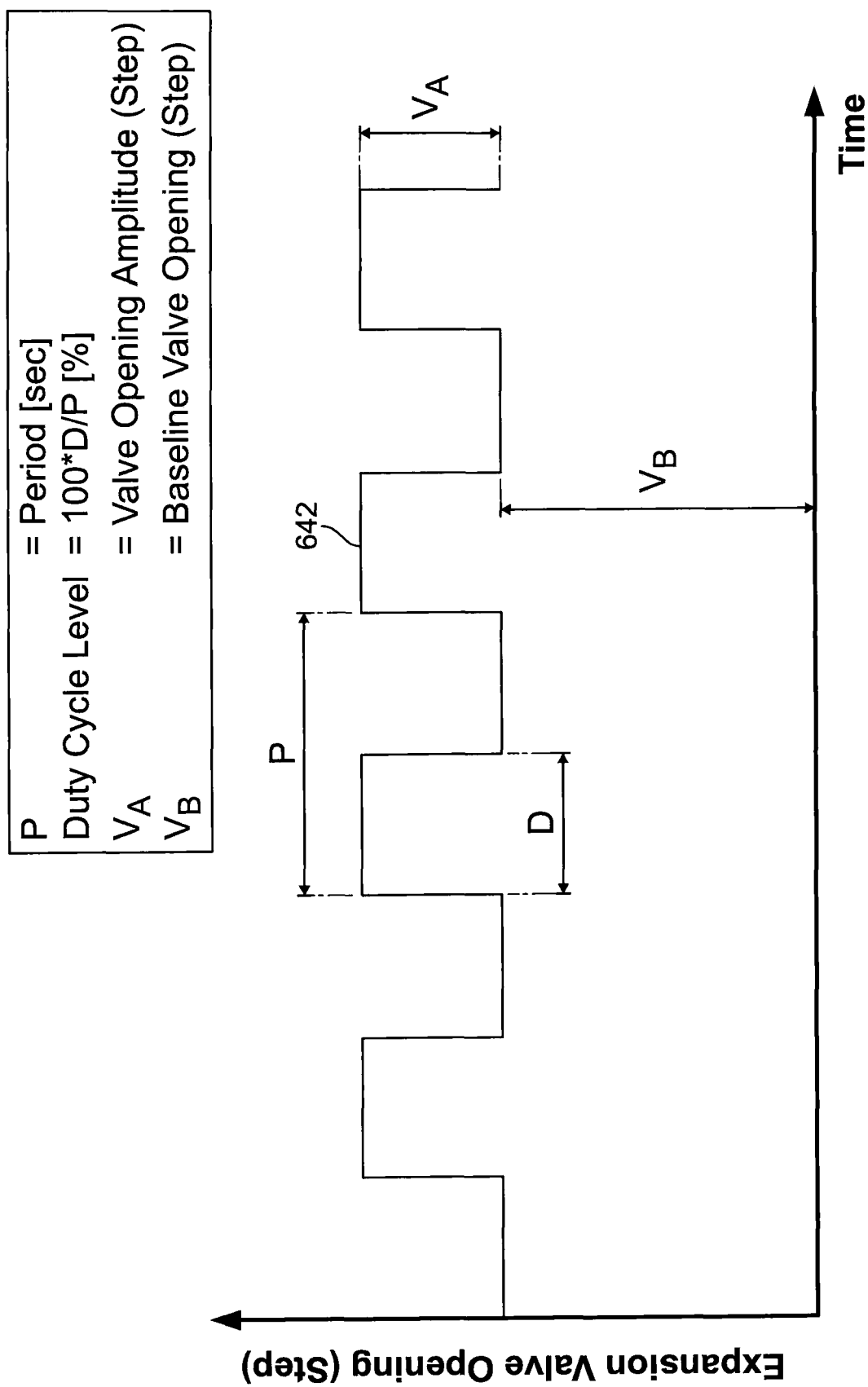
FIG. 45 is a timing diagram of an exemplary embodiment of an expansion valve duty cycle.

FIG. 41 illustrates an expansion valve control process for a climate control system having a single capacity-single speed compressor. A line 626 represents operation of such a compressor at a constant speed, or constant capacity. In the present example embodiment, an expansion valve duty cycle is modulated to cause refrigerant perturbations. A curve 628 shows evolution of the expansion valve opening as the expansion valve is progressively closed. A duty cycle 642 (shown in FIG. 45) of the expansion valve is superimposed on the modulation of a baseline opening value $V_B$ of the expansion valve. The duty cycle 642 imposed on the expansion valve opening is configured to develop temperature signal difference oscillations, whereas the baseline opening value $V_B$ is used to control the evolution of the dwell time x and offset value d of the temperature difference signal 630. As a result of the progressive reduction of the expansion valve opening 628, the dwell time x and the offset value d are both controlled and driven to their target values of zero. The dwell time x is progressively reduced to zero, whereas the offset value d is kept at its optimal value of zero. In such operating condition, the refrigerant liquid-to-vapor transition point is driven to be in close proximity with an outlet of the evaporator heat exchanger, producing a desired optimal efficiency of the climate control system.

Figure 42:
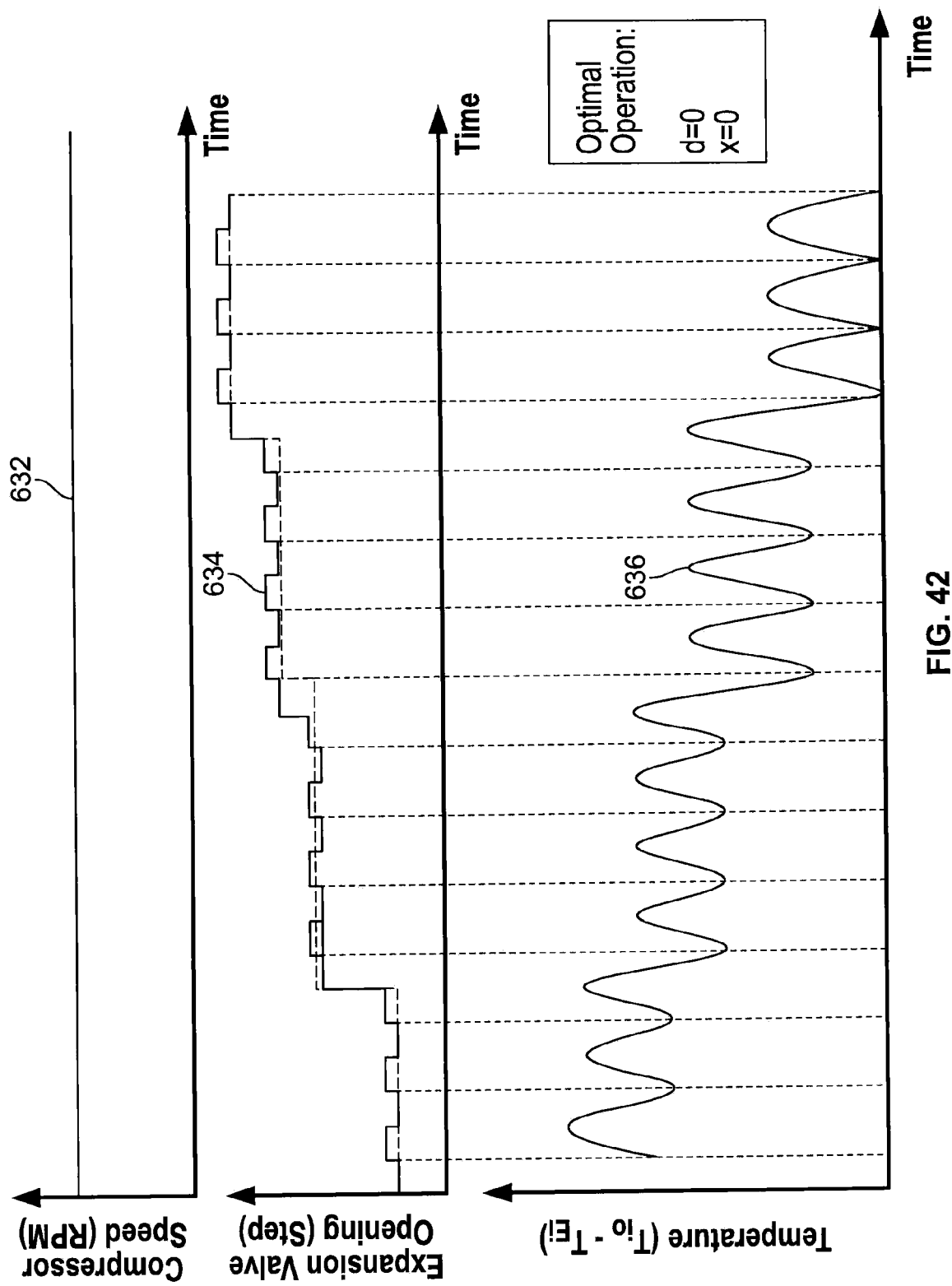
FIG. 42 is a timing diagram of an exemplary embodiment of using an expansion valve duty cycle in control of the expansion valve.

FIG. 42 illustrates an expansion valve control process for a climate control system having a single capacity-single speed compressor. A line 632 represents operation of such a compressor at a constant speed, or constant capacity. In the present example embodiment, an expansion valve duty cycle is modulated to cause refrigerant perturbations. A curve 634 shows evolution of the expansion valve opening as the expansion valve is progressively closed. A duty cycle 642 (shown in FIG. 45) of the expansion valve is superimposed on the modulation of a baseline opening value $V_B$ of the expansion valve. The duty cycle 642 imposed on the expansion valve opening is configured to develop temperature signal difference oscillations, whereas the baseline opening value $V_B$ may be used to control the evolution of the dwell time x and offset value d of the temperature difference signal 630. As the expansion valve opening 628 gradually and progressively increases, the dwell time x and the offset value d are both controlled and driven to their target values of zero. The offset value d is progressively reduced to zero, whereas the dwell time x is retained at zero. In such operating condition, the refrigerant liquid-to-vapor transition point is driven to be in close proximity with an outlet of the evaporator heat exchanger, producing a desired optimal efficiency of the climate control system.

Accordingly, the description of the various embodiments above is merely exemplary in nature and, thus, variations that do not depart from the gist of the invention are intended to be within the scope of the invention. Additional design considerations, such as a stepper motor or modulating coil for the valve, may be incorporated, and such variations are not to be regarded as a departure from the spirit and scope of the invention. Accordingly, it is not intended that the invention be limited by the particular embodiment or form described above, but by the appended claims.

Terms such as "upper," "lower," "inner," "outer," "vertically," "horizontally," "inwardly," "outwardly," and the like when used herein refer to positions of the respective elements as they are shown in the accompanying drawings, and the disclosure is not necessarily limited to such positions.

The foregoing description of the embodiments of the present invention has been provided for purposes of illustration and description. It is not intended to be exhaustive or to limit the invention to the precise forms disclosed. Individual features of a particular embodiment are generally not limited to that particular embodiment, but, where applicable, are interchangeable and can be used in a selected embodiment, even if not specifically shown or described.

What is claimed is:

1. A controller for controlling the flow of refrigerant through an evaporator coil of a climate control system, the controller comprising:
    an expansion valve having a variable opening area through which to regulate the flow of the refrigerant to the evaporator coil, the controller configured to:
    based on temperature of the refrigerant sensed by an evaporator coil temperature sensor configured to sense temperature of the refrigerant near an outlet of the evaporator coil, determine a first control set point and a second control set point subsequent to the first control set point; and
    use the control set points to determine a first valve opening area and a second valve opening area subsequent to the first valve opening area, to regulate the flow rate of the refrigerant into the evaporator coil such that oscillating temperature of the refrigerant approaching the outlet of the evaporator coil: (a) is within a temperature band having a lower bound that over time approaches and/or is substantially equal to the liquid-to-vapor transition temperature of the refrigerant, and (b) at the liquid-to-vapor transition temperature of the refrigerant, has a dwell period that over time approaches and/or is substantially equal to zero;
    the regulating performed to position the liquid-to-vapor transition point of the refrigerant in the evaporator coil substantially at the outlet of the evaporator coil.

2. The controller of claim 1, further configured to introduce perturbations resulting from a duty cycle of least one component of the climate control system into the flow of the refrigerant through the expansion valve.

3. The controller of claim 2, where the at least one component having a duty cycle includes a compressor, a fan, and/or the expansion valve.

4. The controller of claim 1, further configured to capture oscillations of the oscillating temperature of the refrigerant based on input from at least one other evaporator coil temperature sensor configured to sense temperature of the refrigerant in the evaporator coil upstream of the outlet of the evaporator coil.

5. The controller of claim 1 configured to determine the second valve opening area larger than the first valve opening area, such that the oscillating temperature of the refrigerant approaching the outlet of the evaporator coil: (a) is within a temperature band having a lower bound that over time approaches the liquid-to-vapor transition temperature of the refrigerant, and (b) at the liquid-to-vapor transition temperature of the refrigerant, has a dwell period that over time is substantially equal to zero.

6. The controller of claim 1 configured to determine the second valve opening area smaller than the first valve opening area, such that the oscillating temperature of the refrigerant approaching the outlet of the evaporator coil: (a) is within a temperature band having a lower bound that over time is substantially equal to the liquid-to-vapor transition temperature of the refrigerant, and (b) at the liquid-to-vapor transition temperature of the refrigerant, has a dwell period that over time approaches zero.

7. A climate control system comprising the controller of claim 1.

* * * * *